(12) United States Patent
Angle et al.

(10) Patent No.: US 12,508,073 B2
(45) Date of Patent: Dec. 30, 2025

(54) SYSTEMS, DEVICES, AND METHODS FOR TISSUE LAYER REMOVAL

(71) Applicant: Paradromics, Inc., Austin, TX (US)

(72) Inventors: Matthew Angle, Austin, TX (US); Mina-Elraheb Saad Hanna, Austin, TX (US); Kevin Boergens, Austin, TX (US); Yifan Kong, Austin, TX (US); Robert Edgington, Austin, TX (US); Kunal Sahasrabuddhe, Austin, TX (US); Devin Fell, Austin, TX (US); Harbaljit Sohal, Austin, TX (US); Matthew Stephen Hopper, Austin, TX (US); Aleksandar Tadic, Austin, TX (US)

(73) Assignee: Paradromics, Inc., Austin, TX (US)

( * ) Notice: Subject to any disclaimer, the term of this patent is extended or adjusted under 35 U.S.C. 154(b) by 385 days.

(21) Appl. No.: 17/406,008

(22) Filed: Aug. 18, 2021

(65) Prior Publication Data

US 2022/0110681 A1 Apr. 14, 2022

Related U.S. Application Data

(63) Continuation of application No. PCT/US2020/020422, filed on Feb. 28, 2020.
(Continued)

(51) Int. Cl.
*A61B 18/20* (2006.01)
*A61B 18/00* (2006.01)

(52) U.S. Cl.
CPC .... *A61B 18/20* (2013.01); *A61B 2018/00351* (2013.01); *A61B 2018/00446* (2013.01);
(Continued)

(58) Field of Classification Search
CPC .......... A61B 18/20; A61B 2018/00446; A61B 2018/00577; A61B 2018/00595;
(Continued)

(56) References Cited

U.S. PATENT DOCUMENTS 6,258,082 B1 * 7/2001 Lin ..................... A61F 9/00804
606/4
8,353,899 B1 * 1/2013 Wells .................... A61B 18/22
606/9
(Continued)

FOREIGN PATENT DOCUMENTS

WO WO-2020180696 A1 9/2020

OTHER PUBLICATIONS

PCT/US2020/020422 International Search Report and Written Opinion dated May 11, 2020.
(Continued)

*Primary Examiner* — Aaron F Roane
(74) *Attorney, Agent, or Firm* — Wilson Sonsini Goodrich & Rosati

(57) ABSTRACT

The present disclosure provides systems, devices, and methods for penetrating a biological membrane. The system may comprise a laser unit configured to generate one or more laser beams. The system may comprise a set of targeting optics configured to direct the one or more laser beams to a target region of the biological membrane. The system may comprise a raster scanner operatively coupled to the laser unit and the set of targeting optics. The system may comprise a non-transitory computer readable storage medium comprising a set of instructions. The set of instructions may be configured to control at least one of the laser unit, the set of targeting optics, or the raster scanner to photodisrupt the target region of the biological membrane to a target depth
(Continued)

while minimizing damage to one or more blood vessels in proximity to the target region.

22 Claims, 10 Drawing Sheets

Related U.S. Application Data

(60) Provisional application No. 62/812,913, filed on Mar. 1, 2019.

(52) U.S. Cl.
CPC .............. *A61B 2018/00577* (2013.01); *A61B 2018/00595* (2013.01); *A61B 2018/00642* (2013.01); *A61B 2018/00702* (2013.01); *A61B 2018/00726* (2013.01); *A61B 2018/00732* (2013.01); *A61B 2018/00738* (2013.01); *A61B 2018/00761* (2013.01); *A61B 2018/20355* (2017.05); *A61B 2018/20359* (2017.05); *A61B 2018/20361* (2017.05); *A61B 2218/005* (2013.01); *A61B 2218/007* (2013.01)

(58) Field of Classification Search
CPC ........... A61B 2018/00642; A61B 2018/00702; A61B 2018/00726; A61B 2018/00732; A61B 2018/00738; A61B 2018/00761; A61B 2018/20355; A61B 2018/20359; A61B 2018/20361; A61B 2218/005; A61B 2218/007

USPC ........................................... 607/89
See application file for complete search history.

(56) References Cited

U.S. PATENT DOCUMENTS

| | | | |
|---|---|---|---|
| 9,277,964 B1* | 3/2016 | Hasling | A61B 5/489 |
| 2006/0173263 A1* | 8/2006 | He | A61N 1/05 |
| | | | 600/378 |
| 2011/0040358 A1 | 2/2011 | Bean et al. | |
| 2011/0208054 A1* | 8/2011 | Stewart | A61N 7/02 |
| | | | 606/34 |
| 2012/0000893 A1 | 1/2012 | Broude et al. | |
| 2013/0035676 A1 | 2/2013 | Mitchell et al. | |
| 2016/0022146 A1* | 1/2016 | Piron | A61B 5/0059 |
| | | | 600/411 |
| 2017/0014271 A1 | 1/2017 | Degani et al. | |
| 2017/0290521 A1 | 10/2017 | Angle et al. | |

OTHER PUBLICATIONS

Seeds. Diagnostic mid trimester amniocentesis: How safe? American Journal of Obstetrics and Gynecology (2004) 191, 608-16. Presented at the Sixty-Sixth Annual Meeting of the South Atlantic Association of Obstetricians and Gynecologists, Boca Raton, Florida, Jan. 18-21, 2004.

* cited by examiner

SYSTEMS, DEVICES, AND METHODS FOR TISSUE LAYER REMOVAL

CROSS-REFERENCE

This application is a continuation application of International Application No. PCT/US2020/020422, filed on Feb. 28, 2020, which application claims the benefit of U.S. Provisional Patent Application No. 62/812,913, filed Mar. 1, 2019, which applications are incorporated herein by reference in their entirety for all purposes.

STATEMENT AS TO FEDERALLY SPONSORED RESEARCH

This invention was made with United States Government support under Contract No. N66001-17-C-4005 funded by Defense Advanced Research Projects Agency (DARPA). The Government has certain rights in this invention.

BACKGROUND

The brain is covered by a protective layering known as the meninges which are tougher and more fibrous than the underlying brain tissue. As a result, penetrating through these meninges can in some cases result in significant deformation of the underlying brain tissue, even before penetration through the meninges occurs. In some cases, extensive deformation may result in irreversible brain tissue damage.

SUMMARY

Recognized herein are various limitations with methods currently available for removing tissue layers. The tissue layers may correspond to a portion of a brain. At least one problem associated with insertion of electrodes and other types of probes into a brain is the deformation of underlying brain tissue. Accordingly, there is a need for devices and methods that can reduce damage to underlying brain tissue and surgical equipment during penetration of the meninges.

Damage to underlying brain tissue during penetration of the meninges may be partially mitigated by dissecting the outermost layer (dura mater) of the meninges from the underlying layers prior to insertion of electrodes or probes into the brain. However, the lower leaflet (pia mater) of the meninges may be intimately associated with the brain tissue due to a network of interconnecting blood vessels, and may not easily be removed. The pia mater may be a thin layer and may have different mechanical properties from the underlying brain tissue. Due to the fragility of the neural vasculature and underlying brain tissue, the pia mater may be difficult to manipulate separately from the brain using conventional surgical methods. As a result, electrodes and/or probes may have to pierce through the pia mater in order to access brain tissue.

A certain amount of force may be required to pierce through the pia mater, which may cause deformation of the underlying tissue and result in brain tissue damage. This in turn may translate to poor electrical recording in the case of brain implants, and bad postsurgical outcomes (e.g. tissue swelling, disrupted blood flow, signs of certain immune response biomarkers, etc.). Additionally, if the required amount of force exceeds a certain value, it can damage the device used to execute insertion of electrodes or probes through the meninges.

The systems, devices and methods described herein can address at least the above needs. For example, the systems, devices and methods disclosed herein may be used to modify tissue layers and/or membranes such that the layer(s) can be more easily penetrated without causing damage to underlying tissue. In some cases, the tissue layers and/or membranes may include the pia mater, and/or other meningeal layer. In other cases, the tissue layers and/or membranes may include a portion of a tympanic membrane, an amniotic sac, a heart, a myelin sheath of a nerve, or any other biological material or membrane. The penetration of the tissue layer(s) and/or membrane(s) may involve insertion of high aspect ratio structures such as microwires, microelectrodes, and/or probes. Modification of the tissue layers and/or membranes as described herein may include removing or weakening patches or spots of tissues and/or membranes by means of photonic irradiation. The devices described herein may be configured to remove a defined subset of a tissue and/or a membrane that has been exposed by surgical procedure. The invention may be useful for any clinical applications, including but not limited to brain research applications, which may require controlled insertion of electrodes and other types of probes into a brain.

In an aspect, the present disclosure provides a system for penetrating a biological membrane. The system may comprise a laser unit configured to generate one or more laser beams, a set of targeting optics configured to direct the one or more laser beams to a target region of the biological membrane, a raster scanner operatively coupled to the laser unit and the set of targeting optics, and a non-transitory computer readable storage medium comprising a set of instructions. The set of instructions may be configured to control at least one of (i) the laser unit, (ii) the set of targeting optics, or (iii) the raster scanner to photodisrupt the target region of the biological membrane to a target depth while minimizing damage to one or more blood vessels in proximity to the target region.

In some embodiments, the biological membrane may be selected from the group consisting of a dura mater, an arachnoid mater, and a pia mater. In some embodiments, the biological membrane may comprise a portion of a tympanic membrane, an amniotic sac, a heart, or a nerve.

In some embodiments, the system may further comprise a blower configured to flow a gas across the target region to remove one or more particles from air surrounding the target region. In some embodiments, the gas may comprise an inert gas.

In some embodiments, the gas may humidify one or more tissue regions in the target region to prevent the one or more tissue regions from drying out. In some embodiments, the gas may modulate an ablation characteristic or tissue response of one or more tissue regions in the target region. In some embodiments, the system may further comprise a vacuum configured to remove the gas and the one or more particles from the air surrounding the target region.

In some embodiments, the system may further comprise one or more masks configured to spatially block the one or more laser beams from ablating the one or more blood vessels in the target region to avoid excessive bleeding. In some embodiments, the one or more masks may comprise an application of one or more liquids or gels directly onto a surface of a subject's brain. In some embodiments, the one or more masks may be optically aligned with the one or more laser beams generated by the laser unit for ablation. In some embodiments, the one or more masks may comprise one or more prefabricated polygon masks or custom masks.

In some embodiments, the raster scanner may be configured to generate a raster pattern to avoid ablation of the one or more blood vessels in the target region and to prevent excessive bleeding. In some embodiments, the raster scanner may be configured to use image processing to generate the raster pattern. In some embodiments, the raster scanner may be configured to use one or more sensors to interrupt laser pulses over the one or more blood vessels as ablation is being performed.

In some embodiments, the system may further comprise a physical ring or frame that is held against one or more tissue regions in the target region to maintain uniform laser power on the one or more tissue regions during ablation and to reduce tissue pulsations.

In some embodiments, the system may further comprise an image recognition module or one or more ranging sensors configured to actively adjust a raster pattern or a focus of the one or more laser beams generated by the laser unit to maintain uniform laser power on one or more tissue regions during ablation and to reduce tissue pulsations.

In some embodiments, the system may further comprise a cauterization module configured to target one or more ablated blood vessels and to adjust a power or a focus of the one or more laser beams generated by the laser system to cauterize the one or more ablated blood vessels post-ablation.

In another aspect, the present disclosure provides methods for penetrating a biological membrane. The methods may comprise identifying a target region; determining a thickness of the target region; photodisrupting the target region at a predetermined intensity to cause disruption of the target region of the biological membrane, wherein photodisrupting the target region comprises using at least one of (i) a raster scanner, (ii) a set of targeting optics, or (iii) one or more masks to minimize damage to one or more blood vessels in proximity to the target region; and discontinuing irradiation when a target depth is reached.

In some embodiments, the method may further comprise inserting a high aspect ratio structure into a tissue below the biological membrane.

In some embodiments, the biological membrane may be selected from the group consisting of a dura mater, an arachnoid mater, and a pia mater. In some embodiments, the biological membrane may comprise a portion of a tympanic membrane, an amniotic sac, a heart, or a nerve.

In some embodiments, the method may further comprise flowing a gas across the target region to remove one or more particles from air surrounding the target region. In some embodiments, the gas may comprise an inert gas. In some embodiments, the gas may humidify one or more tissue regions in the target region to prevent the one or more tissue regions from drying out. In some embodiments, the gas may modulate an ablation characteristic or tissue response of one or more tissue regions in the target region. In some embodiments, the method may further comprise using a vacuum to remove the gas and the one or more particles from the air surrounding the target region.

In some embodiments, the one or more masks may be configured to spatially block one or more laser beams from ablating the one or more blood vessels in the target region to avoid excessive bleeding. In some embodiments, the one or more masks may comprise an application of one or more liquids or gels directly onto a surface of a subject's brain. In some embodiments, the one or more masks may be optically aligned with the one or more laser beams. In some embodiments, the one or more masks may comprise one or more prefabricated polygon masks or custom masks.

In some embodiments, the raster scanner may be configured to generate a raster pattern to avoid ablation of the one or more blood vessels in the target region and to prevent excessive bleeding. In some embodiments, the raster scanner may be configured to use image processing to generate the raster pattern. In some embodiments, the raster scanner may be configured to use one or more sensors to interrupt laser pulses over the one or more blood vessels as ablation is being performed.

In some embodiments, the method may further comprise holding a physical ring or frame against one or more tissue regions in the target region to maintain uniform laser power on the one or more tissue regions during ablation and to reduce tissue pulsations.

In some embodiments, the method may further comprise using an image recognition module or one or more ranging sensors to actively adjust a raster pattern or a focus of one or more lasers to maintain uniform laser power on one or more tissue regions during ablation and to reduce tissue pulsations.

In some embodiments, the method may further comprise using a cauterization module to target one or more ablated blood vessels and to adjust a power or a focus of one or more lasers to cauterize the one or more ablated blood vessels post-ablation.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the present disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION

Figure 1A:
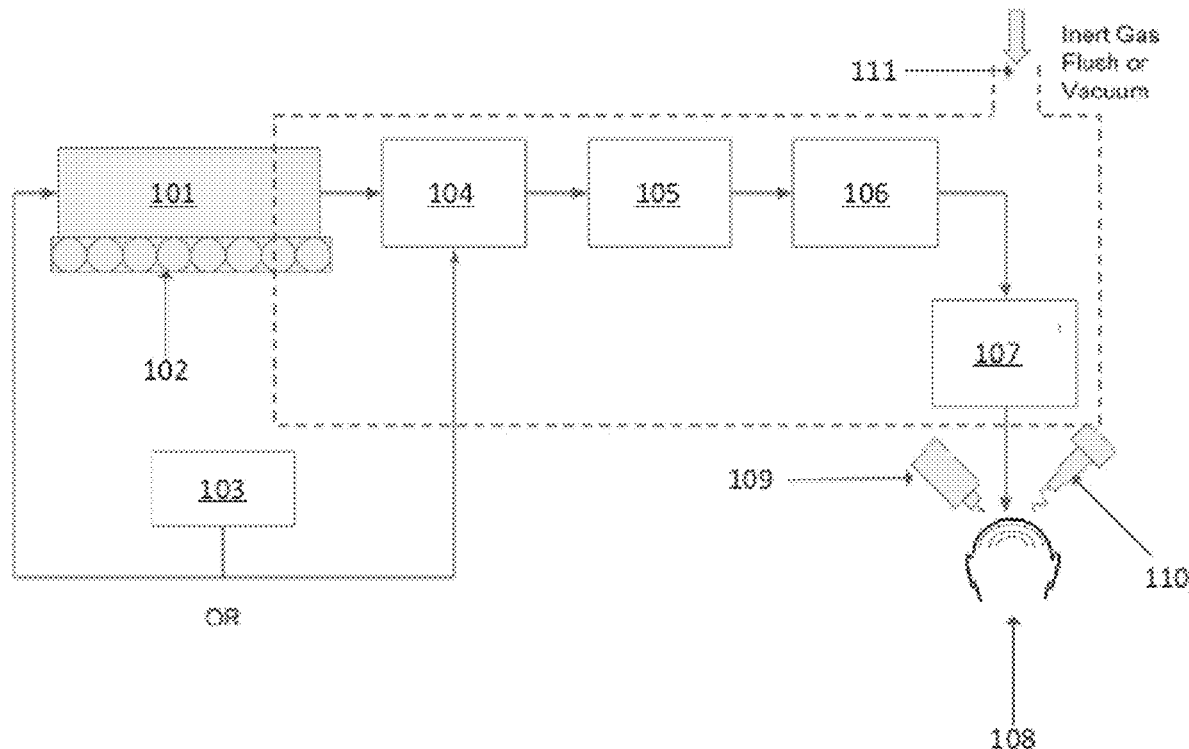
FIG. 1A schematically illustrates an example of a laser ablation system of the present disclosure, in accordance with some embodiments.

The present disclosure provides laser ablation systems, devices and methods for reducing damage to underlying tissue and insertion device during penetration of a tissue and/or a membrane, such as the meninges. The meninges may comprise one or more membranes enveloping a brain or a spinal cord. The meninges may comprise a dura mater membrane, an arachnoid mater membrane, and a pia mater membrane. Penetration of the meninges may involve cutting and/or ablating a surface or a portion of the dura mater, the arachnoid mater, and/or the pia mater. Cutting a surface or a portion of the dura mater, the arachnoid mater, and/or the pia mater may involve puncturing or making an incision through a surface or a portion of the dura mater, the arachnoid mater, and/or the pia mater. Ablating a surface or a portion of the dura mater, the arachnoid mater, and/or the pia mater may involve using a laser to thermally decompose and/or remove biological material from a surface or a portion of the dura mater, the arachnoid mater, and/or the pia mater by irradiating the surface or the portion of the dura mater, the arachnoid mater, and/or the pia mater with a laser beam and/or one or more laser pulses. In such cases, ablation may involve laser ablation and/or photoablation. Laser ablation and/or photoablation may involve a removal of a biological material by irradiating a surface or a portion of a tissue or a membrane comprising the biological material with a light source, such as a laser. At a low laser flux, the biological material may absorb thermal energy from the laser beam and/or one or more laser pulses and subsequently evaporate or sublimate. At a high laser flux, the biological material may be converted to a plasma. Usually, laser ablation may refer to removing biological material with a pulsed laser, but it may be possible to ablate biological material with a continuous wave laser beam with sufficient laser intensity. Cutting and/or ablating may produce a hole or a slit through a surface or a portion of the dura mater, the arachnoid mater, and/or the pia mater. In some cases, cutting and/or ablating may involve shearing off a portion of a surface of the dura mater, the arachnoid mater, and/or the pia mater. In other cases, cutting and/or ablating may produce a flap that allows for a portion of the dura mater, the arachnoid mater, and/or the pia mater to be displaced such that underlying biological materials including brain tissue may be exposed. The flap may comprise a portion of the dura mater, the arachnoid mater, and/or the pia mater. One or more sides of the flap may or may not be attached to a surface or a portion of the dura mater, the arachnoid mater, and/or the pia mater.

Penetrating the meninges by cutting and/or ablation (e.g., laser ablation and/or photoablation) may facilitate insertion of one or more high aspect ratio structures into the brain. The high aspect ratio structures may comprise one or more microwires, one or more microelectrodes, and/or one or more bundles of microwires or microelectrodes. In some cases, the high aspect ratio structures may comprise one or more medical devices or instruments configured to be inserted into a human body or an anatomical structure or component thereof. In some cases, the high aspect ratio structures may comprise one or more medical devices or instruments that are sized and/or shaped for insertion into or through a biological material such as a tissue or a membrane. The high aspect ratio structures may be configured to conduct a current and/or establish a communication pathway between a biological material and an external computing device, medical device, or medical instrument.

A microwire may be a wire that is configured to transmit and/or receive one or more electronic signals. An electronic signal may be a time varying voltage, current, or electromagnetic wave used to carry data or information. In some cases, the microwire may be configured to conduct an electrical current. The microwire may comprise a metal core and a glass coating physically coupled to each other. The microwire may comprise a conductive core surrounded by an insulating layer. The conductive core and/or the insulating layer may be made of any appropriate material that is biocompatible and suitable for insertion into neural matter. The conductive core may be made of a metal (e.g., gold, copper, platinum, silver, etc.) or any metallic alloy. In some cases, the conductive core may comprise one or more elements selected from the group consisting of aluminum, platinum, calcium, magnesium, barium, scandium, titanium, vanadium, chromium, manganese, iron, cobalt, nickel, copper, zinc, yttrium, niobium, molybdenum, ruthenium, rhodium, silver, cadmium, actinium, iridium, tungsten, and gold. In some cases, the conductive core may comprise an intermetallic material. An intermetallic material may be a solid-state compound exhibiting metallic bonding, defined stoichiometry and ordered crystal structure (i.e., alloys). The intermetallic materials may include, but are not limited to, brass (copper and zinc), bronze (copper and tin), duralumin (aluminum, copper, manganese, and/or magnesium), gold alloys (gold and copper), rose-gold alloys (gold, copper, and zinc), nichrome (nickel and chromium), and/or stainless steel (iron, carbon, and additional elements including manganese, nickel, chromium, molybdenum, boron, titanium, silicon, vanadium, tungsten, cobalt, and/or niobium). In some cases, the conductive core may include superalloys. The superalloys may be based on elements including iron, nickel, cobalt, chromium, tungsten, molybdenum, tantalum, niobium, titanium, and/or aluminum. In other cases, the conductive core may be made of a semiconductor, a conductive polymer, or a conductive composite material.

The conductive cores may be exposed at the tip of the distal portion of the wires. In some embodiments, a portion of the insulating layer at the tip of the distal portion may be etched to further expose the conductive cores. The exposed portions of the conductive cores at the tip of the distal portion may correspond to electrodes. The electrodes may be configured to interface with neural matter within a brain. In some embodiments, the electrodes may be electrochemically coated with a low-impedance coating, such as iridium oxide (or other transition-metal oxide, such as MnO2, etc.), a conductive polymer (e.g., PEDOT, etc.), or a material promoting a high surface area (e.g. carbon nanotubes, platinum black, nanoparticle composites, and the like). The surface modification can decrease the interfacial electrical impedance between the exposed conductor core and brain tissue, thereby increasing the sensitivity of the neural-activity recording.

The insulating layer may be made of glass. The insulating layer may also be made of other insulating materials such as silicone compounds (e.g., polydimethylsiloxane (PDMS), poly(methyl methacrylate) (PMMA), etc.), medical-grade epoxies, organic polymer encapsulants, composite materials, ceramics, and the like. In some embodiments, the insulating layer may comprise a plurality of insulating layers having one or more different material properties (e.g., dielectric constant, chemical reactivity/resistance, hardness, etc.).

In some cases, a microwire may be a wire made from an inert metal with a high Young's modulus, such as tungsten, stainless steel, or platinum-iridium alloy. The microwire may be configured to and coated with glass or polymer insulator with exposed conductive tips.

In some cases, the high aspect ratio structure may comprise a wire bundle. The wire bundle may comprise one or more wires (e.g., microwires) extending through a substrate. The wires may be configured to transmit electrical signals between the chip and neural matter within a brain. The wire bundle may comprise n number of wires, where n may be any integer greater than 1. For example, the wire bundle may comprise 100, 1000, 10000, or 1000000 wires, fewer than 100 wires, greater than 1000000 wires, or any number between the aforementioned ranges. In some embodiments, the wire bundle may include at least one wire that is configured to operate as an optical fiber. The optical fiber may be configured to transmit light signals that enable imaging of the neural matter into which a probe is inserted.

The wires may be held together by a support base. A bulk portion of the wires may be embedded within the support base. The bulk portion of the wires may have any shape (e.g., circular, triangular, quadrilateral, etc.) as viewed from the top of the wire bundle. The bulk portion of the wires may have substantially fixed positions since the bulk portion is physically constrained by the support base. The support base may be made of a rigid material. The support base may be made of an insulating material or dielectric. In some embodiments, the support base may be made of an epoxy or resin material. Materials suitable for use as the support base may include silicone compounds (e.g., polydimethylsiloxane (PDMS), poly(methyl methacrylate) (PMMA), etc.), medical-grade epoxies, organic polymer encapsulants, composite materials, ceramics, and the like. In some embodiments, the support base may be made of glass.

The opposite ends of the wires may correspond to a proximal portion and a distal portion. The proximal portion of the wires may be configured to be mechanically/electrically connected to a chip, as described in detail later in the specification.

The proximal portion of the wires may extend from a first surface of the substrate, and the distal portion of the wires may extend from a second surface of the substrate that is different from the first surface. In some cases, the first surface and the second surface may correspond respectively to a top surface and a bottom surface of the substrate. The first surface and the second surface may be laterally opposite to each other. Additionally, the first surface and the second surface may be substantially parallel to each other. In some cases, the first surface and the second surface may be substantially orthogonal to each other. Alternatively, the first surface and the second surface are oblique to each other. Any spatial arrangement of the first surface relative to the second surface may be contemplated.

The distal portion may correspond to a freely extending portion of the wires. The distal portion of the wires may be configured to interface with a region of the brain. A length of the distal portion 12 of the wires may be configured such that the distal portion of the wires is capable of interfacing with neural matter within the brain. The distal portion of the wires may be relatively unrestrained, and can move relative to one another even though the bulk portion of the wires is rigidly held by the support base. The distal portion of the wires may be flexible and configured to interface with neural matter. The distal portion of the wires may be capable of moving laterally relative to one another upon application of an external force. For example, the distal portion of the wires may be capable of conforming or bending when pressed against neural matter. A rigidity of the distal portion of the wires may depend on the length of the distal portion, akin to a "cantilever effect" whereby the distal portion of the wires is cantilevered from the base support. For example, the rigidity of the distal portion of the wires may increase as the length of the distal portion decreases, such that the distal portion experiences a higher restraint (e.g., the free end of the wires splay out over a smaller area). Conversely, the rigidity of the distal portion of the wires may decrease as the length of the distal portion increases, such that the distal portion experiences a lower restraint (e.g., the free end of the wires splay out over a larger area). The distal portion of the wires may be configured to spread out in a plurality of different directions in a three-dimensional configuration.

The distal portion of the wires may be configured to substantially conform to a surface of the neural matter when the distal portion of the wires is in contact with the surface of the neural matter. In some cases, the distal portion of the wires may be configured to bend when the distal portion of the wires is in contact with the surface of the neural matter. The surface of the neural matter may have an irregular shape (or alternatively, a regular shape). In some cases, the distal portion of the wires may be configured to impinge on and/or partially penetrate the surface of the neural matter. In some other embodiments, the distal portion of the wires may be configured to remain rigid, such that the distal portion of the wires does not yield upon contact with or insertion into the neural matter. This results in the distal portion of the wires maintaining the same structural disposition pre-insertion as well as post-insertion into the neural matter.

A length of the bulk portion of the wires may be given by l1. A ratio of the lengths of the bulk portion and the distal portion of the wires may be given by l1:l2. In some embodiments, the ratio l1:l2 may be 1:1, 2:1, 3:1, 4:1, 5:1, 6:1, 7:1, 8:1, 9:1, 10:1, or greater than 10:1. Alternatively, in other embodiments, the ratio l1:l2 may be 1:1, 1:2, 1:3, 1:4, 1:5, 1:6, 1:7, 1:8, 1:9, 1:10, or less than 1:10. Any ratio of l1:l2 may be contemplated. The ratio of l1:l2 may be configured such that the support base provides adequate mechanical strength over a length of the probe that is suitable for enabling insertion of the probe into a brain. At the same time, the ratio of l1:l2 may be configured such that the distal portion of the wires is capable of interfacing with a desired size of the brain area, and sampling the area with a desired sampling density. In some cases, the plurality of wires may have a high aspect ratio in a longitudinal direction extending through the substrate. For example, the aspect ratio may be 100:1, 200:1, 300:1, 400:1, 500:1, 600:1, 700:1, 800:1, 900:1, 1000:1, or greater than 1000:1. Any aspect ratio may be contemplated and designed for, depending on the length of wire needed to reach different parts of the brain (e.g., deep brain regions or superficial brain regions) for different neural applications/stimulations. In some embodiments, the length l2 of the distal portion of the wires may range from about 2 mm to about 4 cm.

The length(s) of the distal portion of the wires may or may not be uniform. The distal portions of the wires in the bundle of microwires may have different length configurations. For example, the distal portion of the wires may have a first length configuration L1, such that the distal portion forms a concave shape. In another example, the distal portion of the wires may have a second length configuration L2, such that the distal portion forms a convex shape. In a different example, the distal portion of the wires may have a third length configuration L3, such that the distal portion has alternating staggered lengths. The length of the distal portion of the wires may be staggered to reduce instantaneous pressure during insertion into neural tissue. A cortical layer may have an amorphous shape or profile, and it may be difficult to accurately target the depth of the cortical layer. The staggered lengths can ensure that a greater volume/area of neural tissue is sampled since the staggered lengths may more closely conform to the amorphous shape/profile of the cortical layer. In some cases, the staggered lengths can contact or penetrate into multiple cortical layers, thus allowing data to be recorded from distinct and separate cortical layers. The distal portion of the wires may be formed having any shape and/or distribution (e.g., circular concave, circular convex, pyramidal, conical, hemispherical, etc.), which can provide advanced recording and/or stimulation of neural activity.

The microwire may have a diameter that is between 1 µm and 100 µm. In some cases, the microwire may have a diameter in a range of about 1 µm to about 10 µm. For example, the microwire may have a diameter in a range of about 1.5 µm to about 4 µm.

The microwire may have a length that is greater than 75 µm. In some cases, the microwire may have a length in a range of about 25 µm to about 75 µm. In other cases, the microwire may have a length of greater than 50 µm. Alternatively, the microwire may have a length that is less than or equal to 75 µm.

In some cases, the microwire may have a coating. At least a portion the coating may have a thickness in a range of about 5 nm (nanometers) to about 10 µm (micrometers).

In some cases, the high aspect ratio structure may be a microelectrode. A microelectrode may be an electrode that is configured to record neural signals or to electrically stimulate brain tissue.

In some cases, the high aspect ratio structure may be a bundle of microelectrodes comprising the microelectrode. Each microelectrode of the bundle of microelectrodes may or may not have the same length. Each microelectrode of the bundle of microelectrodes may or may not have the same diameter or thickness. An end portion of each microelectrode of the bundle of microelectrodes may or may not have the same shape.

In some cases, penetration of the meninges may involve insertion of a neural-interface probe comprising a wire bundle having a plurality of wires configured to interface with neural matter. The wires in the wire bundle may be configured to be electrically interconnected with a chip. The chip may be configured to stimulate and/or monitor brain activity. In some instances, the chip may be an integrated circuit imaging chip capable of recording neural signals from areas and/or curved surfaces within a brain. In some cases, the wires of the wire bundle may be individually addressable, such that one or more wires can be configured to provide multi-site, spatially controlled stimulation of neural matter. For example, the chip may comprise a plurality of pixels controlling a plurality of electrodes. One or more wires of the wire bundle may be connected to each pixel. The stimulation frequency and amplitude of each electrode can be individually fine-tuned to control the pixels.

In some cases, the neural-interface probe may comprise a wire bundle substrate and a chip. The wire bundle substrate and the chip may be electrically and mechanically coupled to each other via a plurality of interconnects. The neural-interface probe may further comprise an underfill dispensed between the wire bundle substrate and the chip. The underfill may be an encapsulant material that surrounds the plurality of interconnects.

Additional examples of microwires, microelectrodes, bundles of microwires or microelectrodes are described in U.S. patent application Ser. No. 15/482,583 (published as US 2017/0290521) entitled "Neural-Interface Probe and Methods of Packaging the Same" which is incorporated herein by reference.

The systems disclosed herein may be configured to penetrate a biological membrane. The biological membrane may be a dura mater, an arachnoid mater, and/or a pia mater. The system may comprise a laser, targeting optics, a raster scanner, and a non-transitory computer readable storage medium configured to control the targeting optics and the raster scanner such that a target is photodisrupted to a sufficient depth.

FIG. 1A shows an example laser ablation system of the present disclosure, in accordance with some embodiments. The system may comprise a laser 101. The laser may be positioned adjacent to a set of gross laser adjustment rails 102. The set of gross laser adjustment rails 102 may be configured to adjust a position and/or orientation of the laser 101 or to adjust a beam path of the laser 101. In some cases, the system may comprise an alignment laser 103. The alignment laser 103 may be positioned within a beam path of the laser 101. The alignment laser 103 may allow for more precise targeting of a desired target area by visually indicating the desired target area. The target area may be any portion or any surface of the dura mater, arachnoid mater, and/or pia mater that is targeted for ablation using the laser 101.

The laser 101 may be directed along a beam path through a partial mirror 104, a beam expander 105, a scan mirror 106, and/or an adjustable focusing lens 107. The beam path of the laser 101 may direct the laser 101 to a target area of a target object 108. The target area may be a portion of the target object 108 that has been selected and/or targeted by the system or an operator of the system for laser ablation. The target object 108 may comprise a plurality of membranes comprising a dura mater, an arachnoid mater, and/or a pia mater. The plurality of membranes may be layered on top of and/or adjacent to one another. In some cases, the target area may be a portion or a surface of the dura mater, the arachnoid mater, and/or the pia mater of the target object 108 that has been selected and/or targeted by the system or an operator of the system for laser ablation. The target object 108 may be a living organism, including but not limited to a human, an animal, and/or any organism comprising a biological material (e.g., tissue) that may be thermally decomposed and/or removed by laser ablation.

In some cases, the system may comprise a test sensor 109. The test sensor 109 may be a non-destructive test sensor. The test sensor 109 may comprise targeting optics configured to visually indicate a portion or a surface of the dura mater, the arachnoid mater, and/or the pia mater of the target object 108 that has been selected and/or targeted by the system or an operator of the system for laser ablation. In some cases, the system may comprise a nozzle 110. The nozzle 110 may be configured to control a flow of a gas across a target area of the target object 108. The gas may be provided from a gas source that is in fluid communication with an inlet 111 of the system. The gas may be an inert gas (e.g., nitrogen). The gas may be used to flush ambient material from an ablation site. The ablation site may correspond to the target area or a portion of the target area that is exposed to the laser 101. Ambient material may or may not comprise a biological material of the dura mater, the arachnoid mater, and/or the pia mater. In some cases, ambient material may comprise biological material remaining in the target area after laser ablation of the target area. The nozzle 110 may be configured to control a flow of a gas across the ablation site to dry out exposed biological material, keep exposed biological material moist, or introduce one or more chemical compounds to modulate an ablation characteristic (e.g., a rate of ablation) and/or a response characteristic (e.g., a change in elasticity) of the biological material during ablation. The gas may be a gas that facilitates quick removal of ablated material, for example helium. In some cases, the gas may be used to flush a beam path of the laser 101 to inhibit ambient ozone generation from an interaction of the beam with molecular oxygen, which may pose a safety risk to an operator of the system or deteriorate one or more components of the laser ablation system. In some cases, the absorption of laser light by the gas may reduce the potential output power of the laser 101.

The laser ablation system may comprise an inlet 111. In some cases, the inlet may be in fluid communication with a gas source that may provide a gas for flushing an ablation site. In other cases, the inlet may be in fluid communication with a vacuum. The vacuum may be configured to remove ambient material from the ablation site using a local tube. In some cases, the vacuum may be configured to introduce a global flow in the system that directs the ambient material to flow out of the system through the inlet 111.

In some cases, the alignment laser 103 may be directed along another beam path through a partial mirror 104, a beam expander 105, a scan mirror 106, and/or an adjustable focusing lens 107. The other beam path of the alignment laser 103 may or may not be different from the beam path of the laser 101. In some cases, a plurality of alignment lasers comprising the alignment laser 103 may be used to target a desired focal point of one or more optical elements (e.g., the adjustable focusing lens) of the laser ablation system.

Figure 1B:
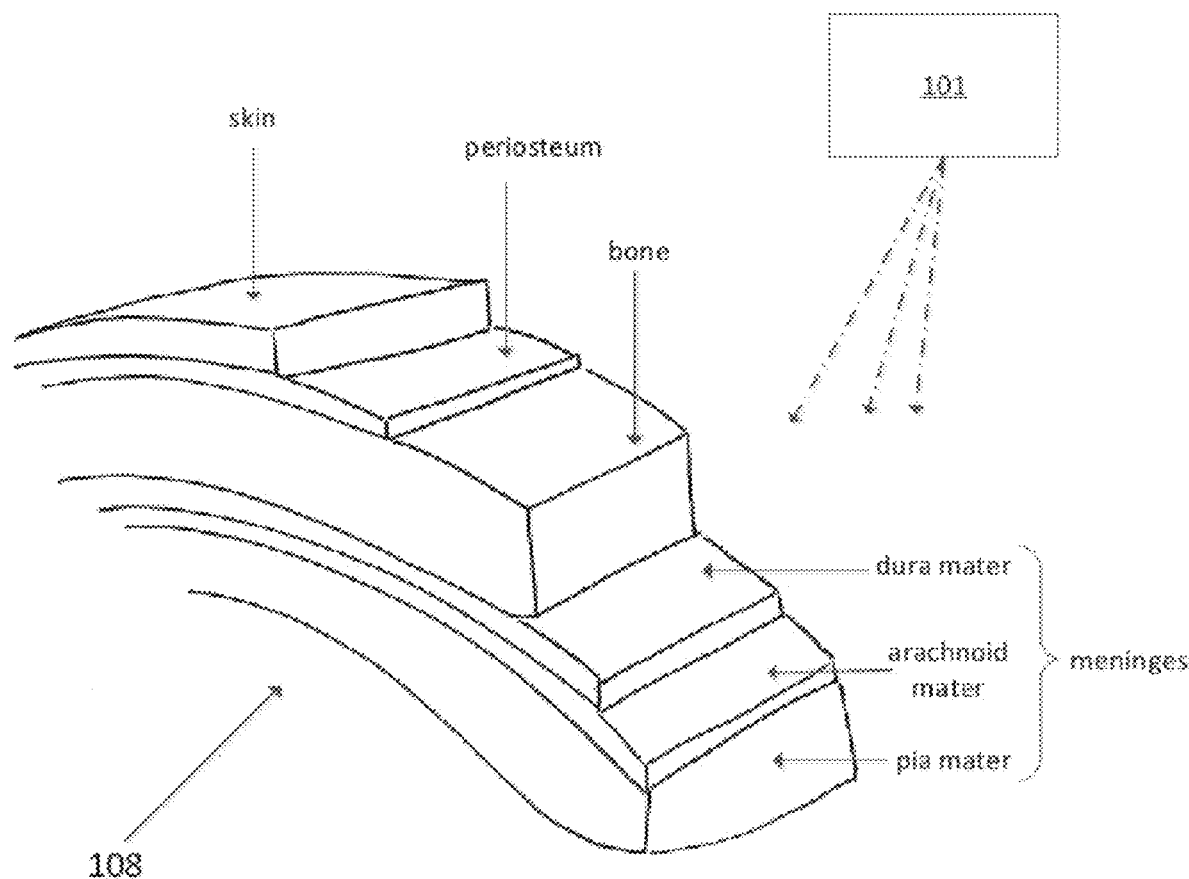
FIG. 1B schematically illustrates a cross-sectional view of a meninges of a target object, in accordance with some embodiments.

As shown in FIG. 1B, the laser ablation system may be configured to direct a laser 101 to a target area of a target object 108. The target object 108 may comprise a plurality of membranes comprising a dura mater, an arachnoid mater, and/or a pia mater. The plurality of membranes may be layered on top of and/or adjacent to one another. The target area may be a portion or a surface of the dura mater, the arachnoid mater, and/or the pia mater of the target object 108 that has been selected and/or targeted by the system or an operator of the system for laser ablation.

The system may comprise one or more lasers. The one or more lasers may comprise lasers of different types, and may include any laser that produces laser beams or pulses with wavelengths within the ultraviolet, visible, or infrared spectrum. The one or more lasers may be configured to operate in either a continuous wave mode or a pulsed mode to provide pulses that are at least about 1 femtosecond or greater. In some cases, the one or more lasers may comprise excimer lasers that can produce high-energy nanosecond-scale pulses of light with wavelengths within the ultraviolet spectrum and ablate biological tissue without burning the biological tissue. In some cases, the one or more lasers may comprise infrared lasers and/or femtosecond lasers. The wavelengths of the laser beams or the laser pulses generated by the one or more lasers may range from about 193 nanometers (nm) to about 1200 nm, while pulse durations may range from about 1 picosecond (ps) to about 10 microseconds (µs).

In some cases, the laser may be a solid-state laser, a gas laser, a liquid laser, or a semiconductor laser. A solid-state laser may be a laser that uses a solid material (e.g., glass or a crystalline material) as a laser medium. The solid-state laser may be a ruby laser, a Nd:YAG laser, a NdCrYAG laser, an Er:YAG laser, a neodymium YLF (Nd:YLF) solid-state laser, a neodymium doped Yttrium orthovanadate (Nd:YVO4) laser, a neodymium doped yttrium calcium oxoborate Nd:YCa4O(BO3)3 (Nd:YCOB) laser, a neodymium glass (Nd:Glass) laser, a titanium sapphire (Ti:sapphire) laser, a thulium YAG (Tm:YAG) laser, a ytterbium YAG (Yb:YAG) laser, a ytterbium:2O3 (glass or ceramics) laser, a ytterbium doped glass laser (rod, plate/chip, and fiber), a holmium YAG (Ho:YAG) laser, a chromium ZnSe (Cr:ZnSe) laser, a cerium doped lithium strontium (or calcium) aluminum fluoride(Ce:LiSAF, Ce:LiCAF) laser, a promethium 147 doped phosphate glass solid-state laser, a chromium doped chrysoberyl(alexandrite) laser, an erbium doped laser, an erbium-ytterbium co-doped glass laser, a trivalent uranium doped calcium fluoride (U:CaF2) solid-state laser, a divalent samarium doped calcium fluoride (Sm:CaF2) laser, and/or an F-Center laser. A gas laser may be a laser in which an electric current is discharged through a gas inside a laser medium to produce laser light. The gas laser may be an argon laser, a carbon dioxide laser, a carbon monoxide laser, an excimer laser, a helium laser, a helium-neon laser, a krypton laser, a nitrogen laser, or a xenon laser. A liquid laser may be a laser that uses a liquid as laser medium. In some cases, the liquid laser may be a dye laser. A dye lasers may use different organic dyes to produce emissions from the ultraviolet to near infrared spectrum. Dye lasers may be operated in the visible with tunable emissions of red, yellow, green, or blue laser emission at almost any wavelength. The dye laser may use Rhodamine-6G in solution. A semiconductor laser may be a laser that uses a p-n junction of a semiconductor diode as the laser medium. The semiconductor laser may be a semiconductor laser diode, a GaN laser, an InGaN laser, an AlGaInP, an AlGaAs, an InGaAsP, a lead salt laser, a vertical cavity surface emitting laser (VCSEL), a quantum cascade laser, and/or a hybrid silicon laser.

In some cases, the laser may be a chemical laser. A chemical laser may include a hydrogen fluoride laser, a deuterium fluoride laser, a chemical oxygen-iodine laser, or an all gas-phase iodine laser. In other cases, the laser may be a metal-vapor laser. The metal-vapor laser may be a helium-cadmium (HeCd) metal-vapor laser, a helium-mercury (HeHg) metal-vapor laser, a helium-selenium (HeSe) metal-vapor laser, a helium-silver (HeAg) metal-vapor laser, a strontium vapor laser, a neon-copper (NeCu) metal-vapor laser, a copper vapor laser, a gold vapor laser, and/or a manganese (Mn/MnCl$_2$) vapor laser. Alternatively, the laser may be a free electron laser, a gas dynamic laser, a Samarium laser, a Raman laser, and/or a nuclear pumped laser.

In some cases, the system may be configured to use an excimer laser to perform ablation on the meninges and/or to remove a portion of one or more layers or membranes of the meninges (i.e., a portion of a dura meter, an arachnoid mater, and/or a pia mater). The excimer laser may use reactive gases such as chlorine and fluorine mixed with inert gases such as argon, krypton, or xenon. When electrically stimulated, the reactive gases may produce a pseudomolecule or dimer. When exposed to the laser, the dimer may produce light in the ultraviolet range. In some cases, the system may be configured to use a femtosecond laser (i.e., a laser which emits optical pulses with a duration well below 1 picosecond), an infrared (IR) laser, or any other laser with sufficient power to cut and/or ablate the meninges or to remove a portion of the dura meter, the arachnoid mater, and/or the pia mater.

The selection of one or more lasers may depend on a use case, a type of operation, or a desired mechanism of action. If ablation is desired (e.g., for the removal of brain tissue), generally an excimer laser may be preferred. If a mechanism of action such as deep cutting is desired, a femtosecond laser may be more applicable. The excimer laser may be typically operated at about 193 nanometers (nm) and a femtosecond laser may be typically operated at about 1053 nanometers (nm). The laser beams generated by the one or more lasers may be guided from the output of the one or more lasers via a series of mirrors and lenses, and may be ultimately focused on an area to be ablated. The alignment of the one or more lasers may be changed or adjusted by controlling the positions and/or the orientations of the mirrors and/or lenses within the system. By adjusting the positions and/or orientations of these components, the final beam intensity of the laser beams can be modulated, and an area of coverage of a laser beam, laser shot, or laser pulse may be modified. In some cases, the system may comprise a final beam objective configured to control the focus of the laser beams or laser pulses.

The laser may be configured to operate as a continuous wave laser, a single pulsed laser, a Q-switched laser, a repetitively pulsed laser, and/or a mode locked laser.

A continuous wave (CW) laser may be a laser that is configured to produce a continuous, uninterrupted beam of light with a stable output power. Continuous-wave (CW) operation of a laser means that the laser is continuously pumped and may continuously emits pulses of light and/or energy. The emission can occur in a single resonator mode (i.e., a single-frequency operation) or on multiple resonator modes. In some cases, the laser may be configured to operate as a quasi-continuous-wave laser, in which case the laser may only be switched on for limited time intervals.

A single pulsed laser may be a laser that is configured to generate one or more pulses. A pulse may be a burst or an emission of light, energy, and/or electrical current. The pulse may be in the form of an electromagnetic wave. The one or more pulses may be spaced apart by a predetermined time interval. In some cases, the pulse duration may range from about a few hundred microseconds to about a few milliseconds.

A Q-switched laser may be a laser that operates based in part on an intracavity delay (Q-switch cell) which allows the laser media to store a maximum of potential energy. Q-switching may involve generating short energetic pulses from a laser by modulating intracavity losses associated with a resonator of the laser. Under optimal gain conditions, the Q-switched laser may be configured to emit a series of giant pulses. The Q-switched laser may use a pumping mechanism to feed energy into a gain medium. Extraction of energy as a laser pulse may be prevented by keeping the laser resonator losses high. The laser resonator losses may then be rapidly reduced so that the power of the laser radiation builds up very quickly in the laser resonator. In some cases, the Q-switched laser may store energy from a pump of the laser in the atoms or molecules of the lasing medium by preventing the laser gain and the amplification process. Then, when the stored energy is at its maximum, the Q-switched laser may rapidly enable lasing action. The stored energy results in an extremely high laser gain (amplification) that takes place during only a few round trips in the laser cavity, during which a giant pulse may build up. The Q-switched laser may be used to generate one or more high energy pulse at a relatively low repetition frequency.

A repetitively pulsed or scanning laser may be a laser that emits one or more pulses at a fixed or variable pulse rate which may range from a few pulses per second to as high as 20,000 pulses per second. The one or more pulses may be emitted at a predetermined pulse repetition frequency or a predetermined pulsed recurrence frequency.

A mode locked laser may be a laser that operates based in part on one or more resonant modes of the optical cavity which can affect a characteristic (e.g., wavelength, frequency, energy, power, etc.) of the output beam. A mode-locked laser may be a laser to which the technique of active or passive mode locking is applied, so that a periodic train of ultrashort pulses is emitted. The pulses generated by a mode locked laser may repeat periodically based in part on a time that it takes a light emitted by the laser to complete one round trip between one or more mirrors comprising the resonator of the laser. When a laser is mode locked, one or more pulses may circulate the laser resonator. Each time a pulse hits an output coupler mirror, a portion of the energy of the pulse may be emitted or released. The output of a mode locked laser may be a regular pulse train. The mode-locked laser may generate ultrashort laser pulses with a high pulse repetition frequency.

In some cases, the laser may be configured to operate as a continuous-wave mode locked laser. In such cases, the laser may be mode-locked, and the pulse energy (or average power) associated with one or more pulses emitted by the continuous-wave mode locked laser may be constant (i.e. there is no Q-switched mode locking).

In some cases, the system may comprise a controller that is configured to control operation of the laser. For example, the controller may be configured to select and/or switch between one or more modes of operation (e.g., continuous wave, single pulsed, Q-switched, repetitively pulsed, mode locked, continuous-wave mode locked, etc.) for the laser. The laser may be configured to switch between one or more modes of operation based on a selection by a user or operator. The controller may be further configured to control the operation of the laser in continuous wave, single pulsed, Q-switched, repetitively pulsed, mode locked, and/or continuous-wave mode locked mode.

In some cases, the laser may be configured to emit a plurality of pulses. The plurality of pulses may have a pulse energy of between 0.01 microjoules ($\mu J$) and 1 joule (J).

The plurality of pulses may comprise one or more laser pulses with a wavelength of between about 100 nm and about 4000 nm. In some cases, the wavelength may be at least about 100 nm, 200 nm, 300 nm, 400 nm, 500 nm, 600 nm, 700 nm, 800 nm, 900 nm, 1000 nm, 2000 nm, 3000 nm, 4000 nm, or more. In some cases, the wavelength may be at most about 4000 nm, 3000 nm, 2000 nm, 1000 nm, 900 nm, 800 nm, 700 nm, 600 nm, 500 nm, 400 nm, 300 nm, 200 nm, 100 nm, or less.

In some cases, the one or more pulses emitted by the laser may have a pulse duration or a pulse width. The pulse duration may range from about 1 femtosecond to about 1 second.

In some cases, the laser may be configured to emit one or more pulses at a predetermined pulse repetition frequency (PRF). The PRF may range between 1 Hz to 100 MHz.

In some cases, the one or more pulses emitted by the laser may have a pulse energy density. The pulse energy density may range from about 1 $\mu J/cm^2$ to about 100 $J/cm^2$.

The laser may have an average power. The average power may range from about 0.1 milliwatts (mW) to about 1 Watt (W).

The laser beam may have a beam spot size. The beam spot size may range from about 0.01 mm to about 1 cm.

In some embodiments, the laser may be configured to ablate a surface or a portion of the dura mater, the arachnoid mater, and/or the pia mater in a manner such that the laser achieves a penetration depth of between about 0.01 mm to about 1cm.

In some cases, the system may be configured to use an excimer laser to cut or ablate a portion of the meninges (i.e., the dura mater, the arachnoid mater, and/or the pia mater). The excimer laser may have an operational wavelength of approximately 193 nm.

In some cases, one or more properties (e.g., mode of operation, pulse energy, wavelength, pulse duration, pulse width, pulse repetition frequency, pulse energy density, average power, beam spot size, etc.) of the laser may be adjusted to achieve a desired penetration depth during laser ablation and/or to achieve a desired rate of photoablation.

The laser beam can be optimized or adjusted in terms of pulse energy. For example, the pulse energy for one or more laser pulses may be decreased or increased to achieve the desired ablation result while minimizing collateral heat damage.

The laser beam may be optimized and/or adjusted in terms of wavelength. For example, the wavelength for one or more laser pulses may be decreased or increased to achieve the desired ablation result while minimizing collateral heat damage.

The laser beam may be optimized and/or adjusted in terms of pulse duration and/or pulse width. For example, the pulse duration and/or pulse width for one or more laser pulses may be decreased or increased to achieve the desired ablation result while minimizing collateral heat damage.

The laser beam may be optimized and/or adjusted in terms of pulse repetition frequency. For example, the pulse repetition frequency for a series of laser pulses comprising one or more laser pulses may be decreased or increased to achieve the desired ablation result while minimizing collateral heat damage.

The laser beam may be optimized and/or adjusted in terms of pulse energy density. For example, the pulse energy density for one or more laser pulses may be decreased or increased to achieve the desired ablation result while minimizing collateral heat damage.

The laser beam may be optimized and/or adjusted in terms of average power. For example, the average power of the laser may be decreased or increased to achieve the desired ablation result while minimizing collateral heat damage.

The laser beam may be optimized and/or adjusted in terms of beam spot size. For example, the beam spot size for the laser may be decreased or increased to achieve the desired ablation result while minimizing collateral heat damage.

In some cases, the system may comprise two or more lasers. In such cases, the system may be configured to select a laser from a plurality of lasers. In some cases, the system may be configured to interchange between one or more lasers. The one or more lasers may or may not have the same properties (e.g., laser type, mode of operation, pulse energy, wavelength, pulse duration, pulse width, pulse repetition frequency, pulse energy density, average power, and/or beam spot size).

In some cases, the system may comprise a first laser and a second laser. The first laser may have a first wavelength. The first wavelength may suitable for efficient removal of a portion of the meninges and to clear residual material remaining after ablation. The second laser may have a second wavelength. The second wavelength may be suitable for efficient removal of a portion of the meninges that is different from the portion of the meninges removed by the first wavelength. In some cases, the first wavelength may remove a portion of the target material at a first rate. The second wavelength may remove a portion of the target material at a second rate. The first rate may or may not be the same as the second rate. The first laser may have a first set of properties corresponding to laser type, mode of operation, pulse energy, wavelength, pulse duration, pulse width, pulse repetition frequency, pulse energy density, average power, and/or beam spot size. The second laser may have a second set of properties corresponding to laser type, mode of operation, pulse energy, wavelength, pulse duration, pulse width, pulse repetition frequency, pulse energy density, average power, and/or beam spot size. The first set of properties and the second set of properties may be different.

Selection between a first laser with a first set of properties and a second laser with a second set of properties depends on the biological material (e.g., the dura mater, the arachnoid mater, or the pia mater), the desired depth of penetration, and/or the desired rate of photoablation. If ablation is desired, an excimer laser may be preferred. If a mechanism of action such as deep cutting is desired, a femtosecond laser may be more applicable.

The system may comprise a series of mirrors, lenses, and/or optical elements to align the laser, guide the laser, and ultimately focus the laser on a target area to be ablated (FIG. 1A and FIG. 1B). The alignment of the laser may be changed by controlling the position or orientation of the mirrors, lenses, and/or optical elements within the system. By altering the position of these components, one or more properties of the laser (e.g., mode of operation, pulse energy, wavelength, pulse duration, pulse width, pulse repetition frequency, pulse energy density, average power, and/or beam spot size) may be adjusted, the final beam intensity may be modulated for more controlled ablation, and the areal coverage of a single pulse may be altered for more precise ablation. The system may also comprise a final beam objective that is configured to control the focus of the laser.

In some cases, the system may comprise one or more optical guide mechanisms to focus the laser beam and/or guide the laser beam to a desired ablation site. An ablation site may be a surface or a portion of the dura mater, the arachnoid mater, and/or the pia mater that is exposed to the laser beam and/or one or more laser pulses. The one or more optical guide mechanisms may comprise, for example, a piezoelectric mirror, a dichroic mirror, an acousto-optic deflector, a rotating mirror, an oscillating mirror, a collimating lens, and/or a light-converging lens.

The system may have one or more visible alignment lasers positioned within a beam path of the laser. The visible alignment lasers may allow for more precise targeting of the desired area by visual inspection. For example, a laser may be added directly to the beam path to indicate the desired area of ablation. Alternatively, a combination of lasers may be used to indicate the desired area of ablation.

In some cases, one or more visible alignment lasers may be added directly to the beam path to indicate the exact area of ablation, either by outlining a desired area of ablation or by providing a reference pattern. A combination of lasers may also be used to target the correct focal point of the lens. The combination of lasers may include one or more lasers that can generate laser beams or laser pulses with wavelengths that are within the visible spectrum (e.g., within a range of about 400 nanometers to about 700 nanometers). The one or more lasers may be less than about 5 milliwatts (mW) so as to not cause unintended tissue damage. In such cases, the one or more lasers may be class 3R or less. Alternatively, lasers that can generate laser beams or laser pulses with wavelengths within the infrared spectrum (e.g., within a range of about 700 nanometers to about 1 millimeter) may be used to interface with one or more cameras or other positional sensors of the system to perform or facilitate alignment of one or more lasers relative to an area of ablation.

In some cases, gross alignment of the laser may be performed by changing the positioning of one or more components internal to and/or external to the laser. For example, the laser may be attached to a series of rails and/or manipulators, and may be capable of movement in any number of degrees of freedom, including XYZ translations and/or tilts (e.g., rotations about an X, Y, and/or Z axis). To perform moderately finer alignment, a final lens of the laser may be moved laterally and/or tilted to alter the lateral position of the beam. A focal point of the laser beam may also be adjusted by changing a position or an orientation of the beam path through a physical movement or displacement of the lens. Both "coarse" and "moderate" adjustment may be performed as part of an automated scan package, or manually in the surgical suite. In some cases, "coarse" and/or "moderate" adjustments may be performed automatically by the system based on readings from one or more sensors, or manually by a user or an operator of the surgical suite. In some cases, other optical elements in the beam path may be moved to change the final beam position as well. The maximum scan area may be approximately the same size or greater than the surgical area to ensure complete coverage. The size and/or the shape of the surgical area may vary depending on a case-by-case basis. In the case of an unusually large surgical area, an indexing system for positioning the laser setup or the surgical subject can be implemented, either through a use of physical markers or a separate indexing laser. The indexing laser may comprise a low power laser of a wavelength that falls in the visible spectrum or longer. In some cases, the low power laser may have a wavelength of at least about 400 nanometers to about 700 nanometers. In some cases, the low power laser may have a wavelength that is at least about 700 nanometers or greater. By utilizing a position indexing system and by re-positioning either the laser setup or the surgical subject, a larger surgical area can be ablated.

The system may comprise a mechanism for flushing or vacuuming ambient material from an ablated site. An ablated site may be a portion of the dura mater, the arachnoid mater, and/or the pia mater that has been exposed to a laser such that biological material from the dura mater, the arachnoid mater, and/or the pia mater has been removed. After ablation, ambient material may remain adjacent to and/or in the vicinity of the ablated site. The ambient material may comprise the biological material removed from the dura mater, the arachnoid mater, and/or the pia mater. Flushing or vacuuming the ambient material from an ablated site may help to control the local ablation environment and to increase consistency of each ablation shot (i.e., laser pulse). In some cases, the system may comprise a local flow tube or a global flow tube configured to remove the ambient material through vacuum. In other cases, the system may be configured to introduce an inert gas or a controlled humidity flow to remove the ambient material from the local ablation environment through flushing. Flushing or vacuuming can have the effect of drying out the tissue, keeping it moist, or introducing other chemicals into the environment to modulate ablation characteristics and/or tissue response characteristics. The flushing gas may be chosen such that it facilitates efficient removal of ablated material. In some examples, the flushing gas may be helium.

As described above, the system may comprise a mechanism for flushing or vacuuming ambient material from the ablated site. Flushing and/or vacuuming the ambient material may help to control the local ablation environment and increase consistency of each laser ablation shot. If the ambient material is removed through a vacuum, then either a local tube or a global flow can be introduced into the local ablation environment. If the local ablation environment is to be controlled through flushing, then an inert gas or a controlled humidity flow can be introduced. The inert gas and/or the controlled humidity flow can have the effect of drying out the tissue, keeping it moist, or introducing other chemicals into the local ablation environment to modulate the ablation characteristics as well as the tissue response. The flushing gas may comprise a gas (e.g., helium) that facilitates quick removal of ablated material. A combination of flushing and vacuuming can be used to control the evacuation or removal of the ablated material. The lines and nozzles for flushing and/or vacuuming may be fixtured to permit positioning or repositioning of the lines and/or nozzles in any direction or angle, depending on the subject's position and the surgical need.

Figure 4:
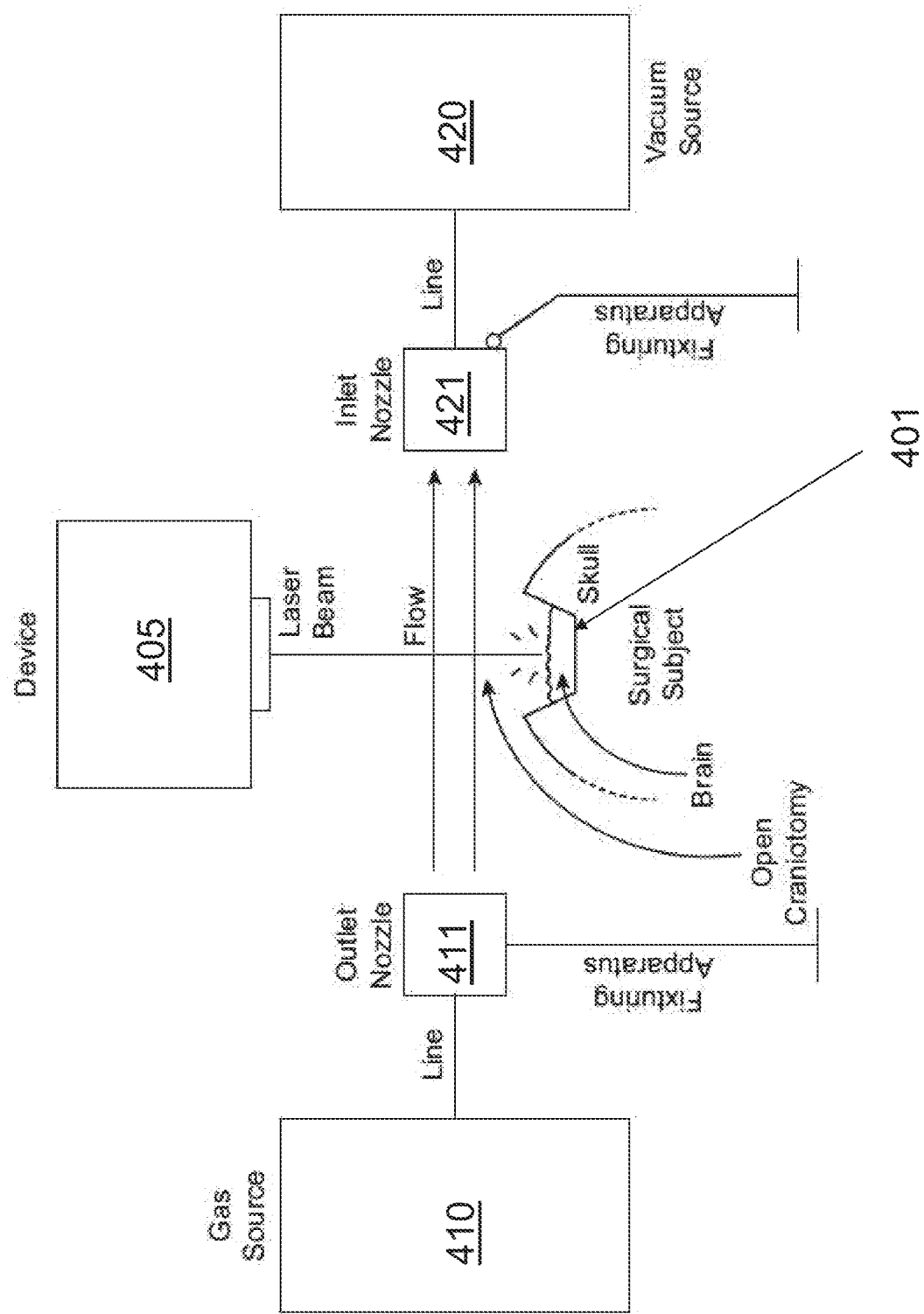
FIG. 4 schematically illustrates a mechanism for flushing and vacuuming ambient material from an ablation site, in accordance with some embodiments.

FIG. 4 illustrates an example of a mechanism that may be used for flushing or vacuuming ambient material from an ablation site 401. The ablation site 401 may comprise one or more portions of a subject's brain (e.g., one or more membranes enveloping the brain, such as a dura mater membrane, an arachnoid mater membrane, and/or a pia mater membrane). The ablation site 401 may be optically aligned with a laser system 405 that is configured to generate and direct one or more laser beams onto the ablation site 401 for laser ablation. The mechanism for flushing or vacuuming ambient material may comprise a gas source 410 that is configured to flow a gas through an outlet nozzle 411 onto and/or across an ablation site 401. The gas may be configured to remove one or more ambient particles from the air surrounding the ablation site 401 and to control a humidity of the ablation site 401. The gas may dry out the tissue, keep the tissue moist, and/or introduce other chemicals into the ablation site 401 to modulate the ablation characteristics and tissue response. The mechanism for flushing or vacuuming ambient material may comprise a vacuum 420 that is configured to remove the gas and/or the one or more ambient particles from the air surrounding the ablation site 401 through an inlet nozzle 421. Fixturing of the flush lines and outlet nozzle 411 and/or the vacuum lines and inlet nozzle 421 may allow for positioning of the outlet nozzle 411 and the inlet nozzle 421 in any direction or angle, depending on the subject's position and the surgical need.

The beam path of the laser system may or may not be flushed with an inert gas, such as nitrogen, helium (He), argon (Ar), neon (Ne), krypton (Kr), xenon (Xe), and/or radon (Rn). Flushing or containment of an inert gas may help to inhibit ambient ozone generation from an interaction of the laser beam with oxygen molecules, which may pose a safety or comfort risk to operators or deteriorate the surrounding equipment. Further, any absorption of the laser beam by the inert gas may reduce the potential output power of the laser.

Successful removal of a portion of the meninges and/or other biological material (e.g., dura mater, the arachnoid mater, or the pia mater) may involve limiting damage to blood vessels nearby and/or in the vicinity of the ablation site. In some cases, a mask can be used that protects nearby blood vessels from radiation damage due to the laser pulses. In other cases, the system may be configured to control a movement of the laser beam, to modulate one or more properties of the laser beam, or to shape the laser beam in a manner such that the laser beam does not target areas that are adjacent to sufficiently large blood vessels.

In some cases, a mask may be used to protect nearby blood vessels from radiation damage due to the laser pulses. The mask may comprise of a number of different materials. These can include a metallic material, a polymeric material, a ceramic material, and/or any other composite solid material. The mask may comprise a metal mask, a ceramic mask, or a polymer mask. In some examples, aluminum, stainless steel, titanium nickel or tungsten may be used for metal masks. In some cases, ceramic masks may comprise silicon, glass that is opaque to the utilized wavelength but transparent to visible light, and/or sapphire. In some cases, polymer masks may comprise polypropylene, polyethylene, one or more fluoropolymers, one or more polyimides, a hydrogel, and/or silicone. In some cases, the polymer masks may comprise a material that is opaque to ultraviolet (UV) or infrared (IR) light but transparent to light in the visible spectrum.

In some cases, the mask may comprise a liquid or gel such as Vaseline, which may be applied through a stencil or directly on the surface of the brain. The applied liquid or gel may harden to form a solid. Methods for generating masks and stencils include, but are not limited to, three-dimensional (3D) printing, machining, stamping, extrusion, casting, and/or molding. The mask or stencil shape may be determined and generated based on various imaging techniques, such as magnetic resonance imaging (MRI) or functional magnetic resonance imaging (fMRI). The mask or stencil shape may be produced or manufactured using any of the above mentioned methods (e.g., three-dimensional (3D) printing, machining, stamping, extrusion, casting, and/or molding). The mask may be created in preparation for an ablation procedure using one or more images acquired through magnetic resonance imaging (MRI) or functional magnetic resonance imaging (fMRI), or may be created by performing lithography on the spot, depending on a level of precision required and a level of complexity of the surgical procedure. In situ mask making can be performed using the ablation system itself, or with a secondary instrument. In some cases, an imaging system of the ablation system may be configured to take one or more images of a tissue surface to be ablated. Afterwards, the imaging system or the ablation system may directly ablate a base material to form the mask. Alternatively, the image may be transferred to a secondary instrument such as a lithography system, a three-dimensional (3D) printer, or a screen printer to create the mask for use with the laser ablation system. If the mask is ablated using the ablation system, then the ablation system may be configured to operate in an alternate "ablation mode" by utilizing a secondary or tertiary laser to perform ablation on the mask, which may be transparent or opaque to other laser beams generated by the ablation system depending on a material composition of the mask. In some cases, the ablation system may be configured to modulate or increase a focus of the original ablation beam to overcome an ablation threshold associated with the mask material.

Figure 5:
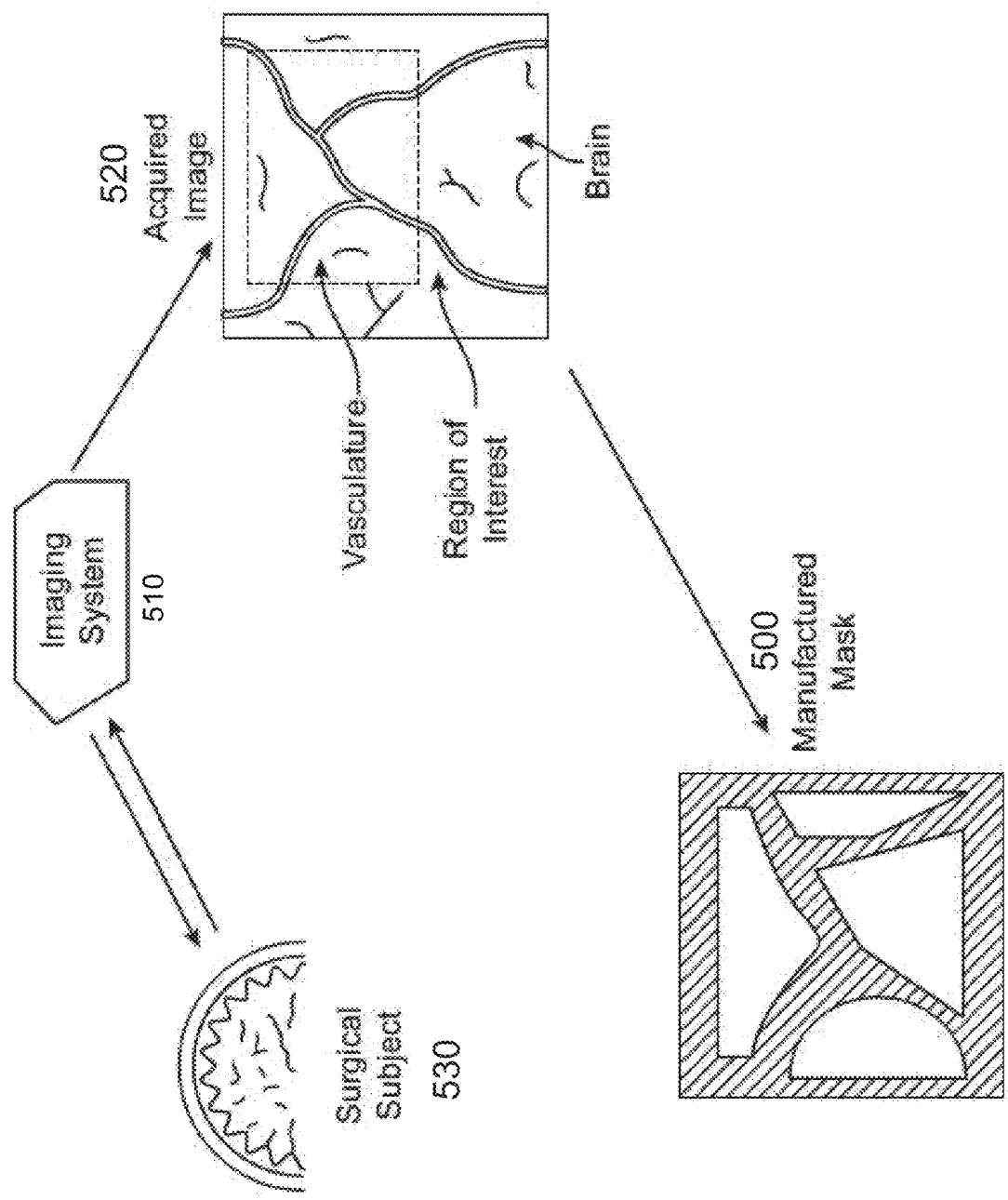
FIG. 5 schematically illustrates a manufactured mask that may be used during laser ablation, in accordance with some embodiments.

FIG. 5 illustrates a manufactured mask 500 that may be used during ablation. The mask 500 may be used to protect nearby blood vessels from radiation damage due to the laser pulses by physically covering one or more portions of the nearby blood vessels within an ablation site. When an imaging system 510 is used to acquire an image 520 of an ablation site of a surgical subject 530, at least a portion of the vasculature within the image 520 may be covered and/or obstructed by the mask 500. In some cases, the mask 500 may be sized and/or shaped to correspond to the size and/or shape of the vasculature within the ablation site.

As described above, in some cases the mask may comprise a metallic material. The metallic material may comprise one or more elements selected from the group consisting of aluminum, platinum, calcium, magnesium, barium, scandium, titanium, vanadium, chromium, manganese, iron, cobalt, nickel, copper, zinc, yttrium, niobium, molybdenum, ruthenium, rhodium, silver, cadmium, actinium, and gold. In some cases, the metallic material may comprise an intermetallic material. The intermetallic material may be a solid-state compound exhibiting metallic bonding, defined stoichiometry and ordered crystal structure (i.e., alloys). The intermetallic material may be in a prealloyed powder form. Examples of such prealloyed powders may include, but are not limited to, brass (copper and zinc), bronze (copper and tin), duralumin (aluminum, copper, manganese, and/or magnesium), gold alloys (gold and copper), rose-gold alloys (gold, copper, and zinc), nichrome (nickel and chromium), and/or stainless steel (iron, carbon, and additional elements including manganese, nickel, chromium, molybdenum, boron, titanium, silicon, vanadium, tungsten, cobalt, and/or niobium). In some cases, the prealloyed powders may include superalloys. The superalloys may comprise iron, nickel, cobalt, chromium, tungsten, molybdenum, tantalum, niobium, titanium, and/or aluminum.

As described above, in some cases the mask may comprise a polymeric material. The polymeric material may comprise one or more polymers. The one or more polymers may comprise monomers to be polymerized into the one or more polymers, oligomers to be cross-linked into the one or more polymers, or both. The monomers may be of the same or different types. An oligomer may comprise two or more monomers that are covalently linked to each other. The oligomer may be of any length, such as at least 2 (dimer), 3 (trimer), 4 (tetramer), 5 (pentamer), 6 (hexamer), 7, 8, 9, 10, 20, 30, 40, 50, 100, 200, 300, 400, 500, or more monomers. In some cases, the one or more polymers may comprise a homopolymer and/or a copolymer. The homopolymer may comprise one or more identical monomer units. The copolymer may be a linear copolymer or a branched copolymer. The copolymer may be an alternating copolymer, periodic copolymer, statistical copolymer, random copolymer, and/or block copolymer. Examples of monomers may include one or more of hydroxyethyl methacrylate; n-Lauryl acrylate; tetrahydrofurfuryl methacrylate; 2, 2,2-trifluoroethyl methacrylate; isobornyl methacrylate; polypropylene glycol monomethacrylates, aliphatic urethane acrylate (i.e., Rahn Genomer 1122); hydroxyethyl acrylate; n-Lauryl methacrylate; tetrahydrofurfuryl acrylate; 2, 2,2-trifluoroethyl acrylate; isobornyl acrylate; polypropylene glycol monoacrylates; trimethylpropane triacrylate; trimethylpropane trimethacrylate; pentaerythritol tetraacrylate; pentaerythritol tetraacrylate; triethyleneglycol diacrylate; triethylene glycol dimethacrylate; tetrathyleneglycol diacrylate; tetrathylene glycol dimethacrylate; neopentyldimethacrylate; neopentylacrylate; hexane dioldimethacylate; hexane diol diacrylate; polyethylene glycol 400 dimethacrylate; polyethylene glycol 400 diacrylate; diethylglycol diacrylate; diethylene glycol dimethacrylate; ethyleneglycol diacrylate; ethylene glycol dimethacrylate; ethoxylated bis phenol A dimethacrylate; ethoxylated bis phenol A diacrylate; bisphenol A glycidyl methacrylate; bisphenol A glycidyl acrylate; ditrimethylolpropane tetraacrylate; and ditrimethylolpropane tetraacrylate.

As described above, in some cases the mask may comprise a ceramic material. The ceramic material may comprise metal (e.g., aluminum, platinum, titanium, etc.), non-metal (e.g., oxygen, nitrogen, etc.), and/or metalloid (e.g., germanium, silicon, etc.) atoms primarily held in ionic and/or covalent bonds. A metal may be any element selected from the group consisting of aluminum, platinum, calcium, magnesium, barium, scandium, titanium, vanadium, chromium, manganese, iron, cobalt, nickel, copper, zinc, yttrium, niobium, molybdenum, ruthenium, rhodium, silver, cadmium, actinium, and gold. A non-metal may be any element selected from the group consisting of hydrogen, carbon, nitrogen, oxygen, phosphorus, sulfur, selenium, fluorine, chlorine, bromine, iodine, astatine, tennessine, helium, neon, argon, krypton, xenon, radon, and oganesson. A metalloid may be any element selected from the group consisting of arsenic, tellurium, germanium, silicon, antimony, boron, polonium, astatine, and selenium. In some cases, the ceramic material may be, for example, aluminide, boride, beryllia, carbide, chromium oxide, hydroxide, sulfide, nitride, mullite, kyanite, ferrite, titania zirconia, yttria, and/or magnesia.

As described above, in some cases the mask may comprise one or more composite materials. The one or more composite materials may comprise fiberglass, carbon fibers, carbon nanofibers, fiber-reinforced polymers, carbon-fiber-reinforced polymers, or glass-reinforced plastics.

In some cases, the mask may comprise a liquid or a gel such as Vaseline, which may be applied through a stencil or directly on the surface of the ablation site (i.e., the dura mater, the arachnoid mater, and/or the pia mater). In some cases, the applied liquid may harden to form a solid.

The mask may have a pattern of apertures. Each aperture may have an opening that exposes biological material (i.e., the dura mater, the arachnoid mater, and/or the pia mater) positioned underneath the mask. Portions of the mask that do not comprise the apertures may be configured to obstruct a line of sight from the laser to the biological material (i.e., the dura mater, the arachnoid mater, and/or the pia mater) positioned underneath the mask.

The mask may have an outer shape. The outer shape may be a circle, a square, a rectangle, a triangle, a pentagon, a hexagon, a heptagon, an octagon, a nonagon, a decagon, or any polygon with at least three or more sides.

The mask may be a temporary mask or a permanent mask. A temporary mask may be a mask that is ultimately removed post-ablation. A permanent mask may be a mask that remains implanted on or near the ablation site once ablation is complete.

Figure 6A:
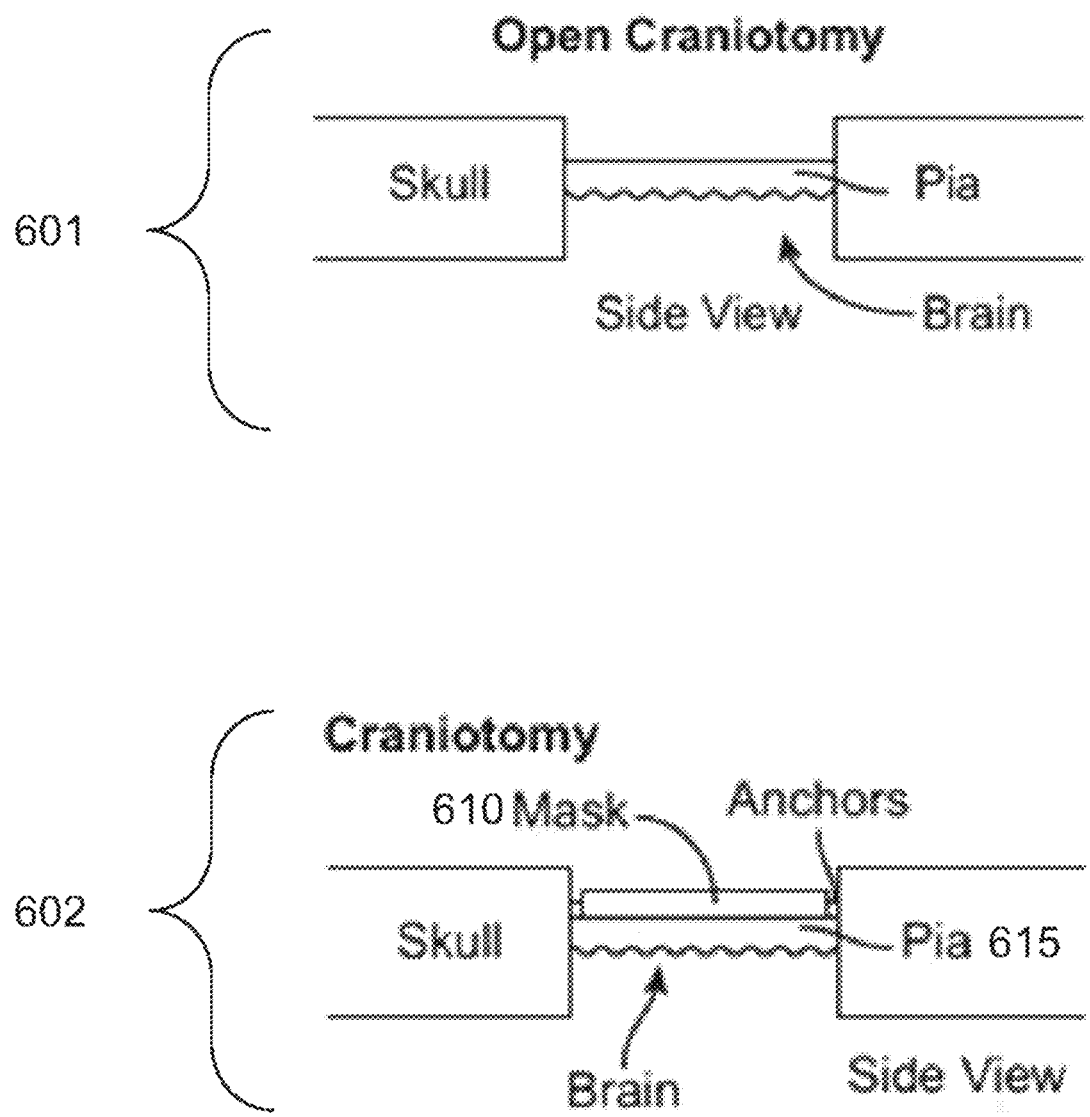
FIG. 6A schematically illustrates examples of open craniotomy and craniotomy performed using a mask, in accordance with some embodiments.

FIG. 6A illustrates examples of open craniotomy and craniotomy performed using a mask. A first example 601 of open craniotomy may not or need not require the use of a mask as described herein. A second example 602 of craniotomy using a mask may involve anchoring a mask 610 to a portion of a subject's skull. The mask 610 may be positioned above and/or adjacent to a pia mater membrane 615 of the subject's brain before ablation is performed.

Figure 6B:
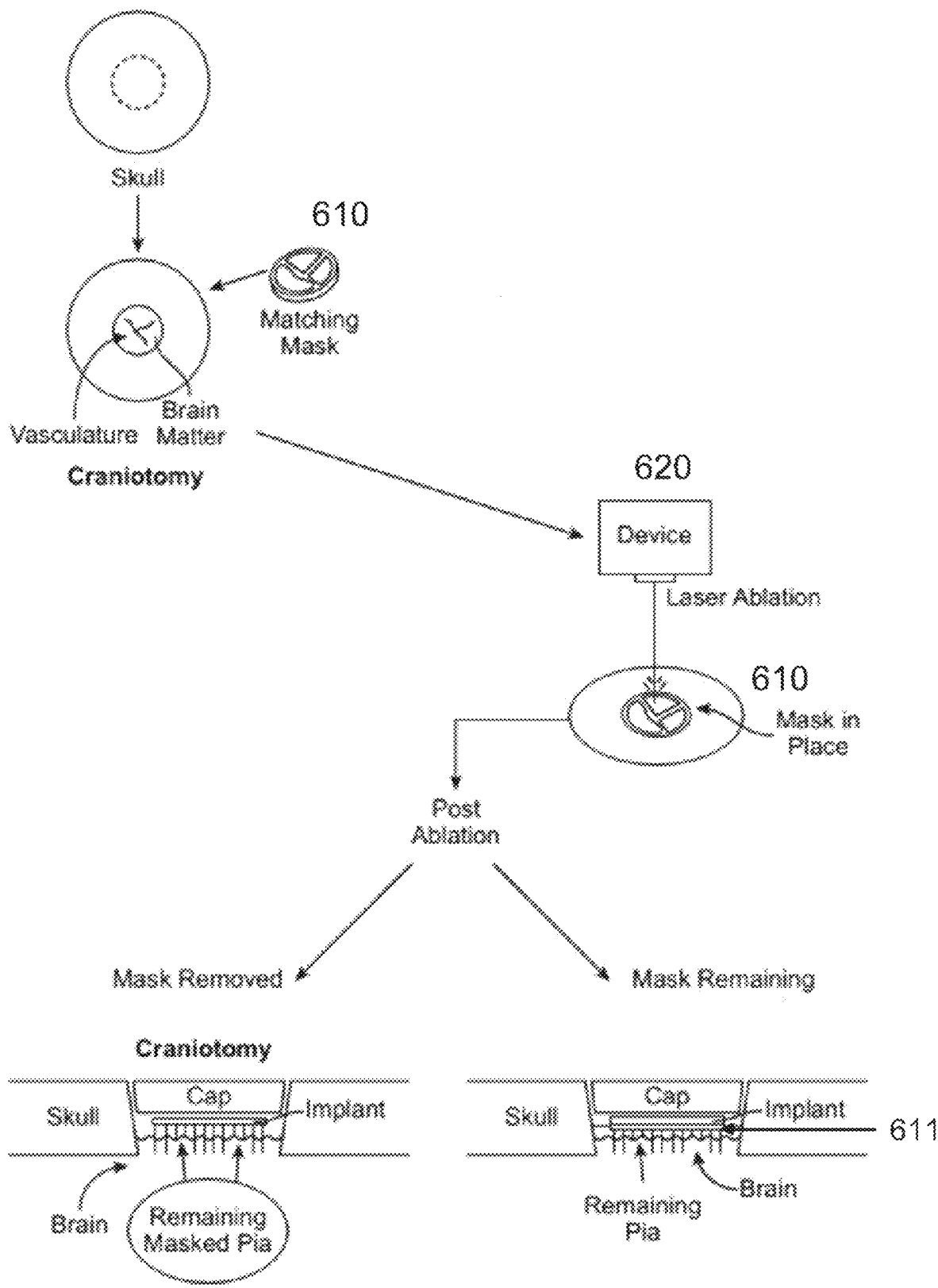
FIG. 6B schematically illustrates a usage of a permanent mask or a temporary mask in conjunction with a laser ablation system, in accordance with some embodiments.

FIG. 6B illustrate a usage of a mask 610 in conjunction with a system 620 configured to perform laser ablation and tissue removal. The mask 610 may comprise a temporary mask that is removable post-ablation. In some cases, the mask 610 may comprise a permanent mask 611 that remains implanted on or near the ablation site once ablation is completed.

Figure 7:
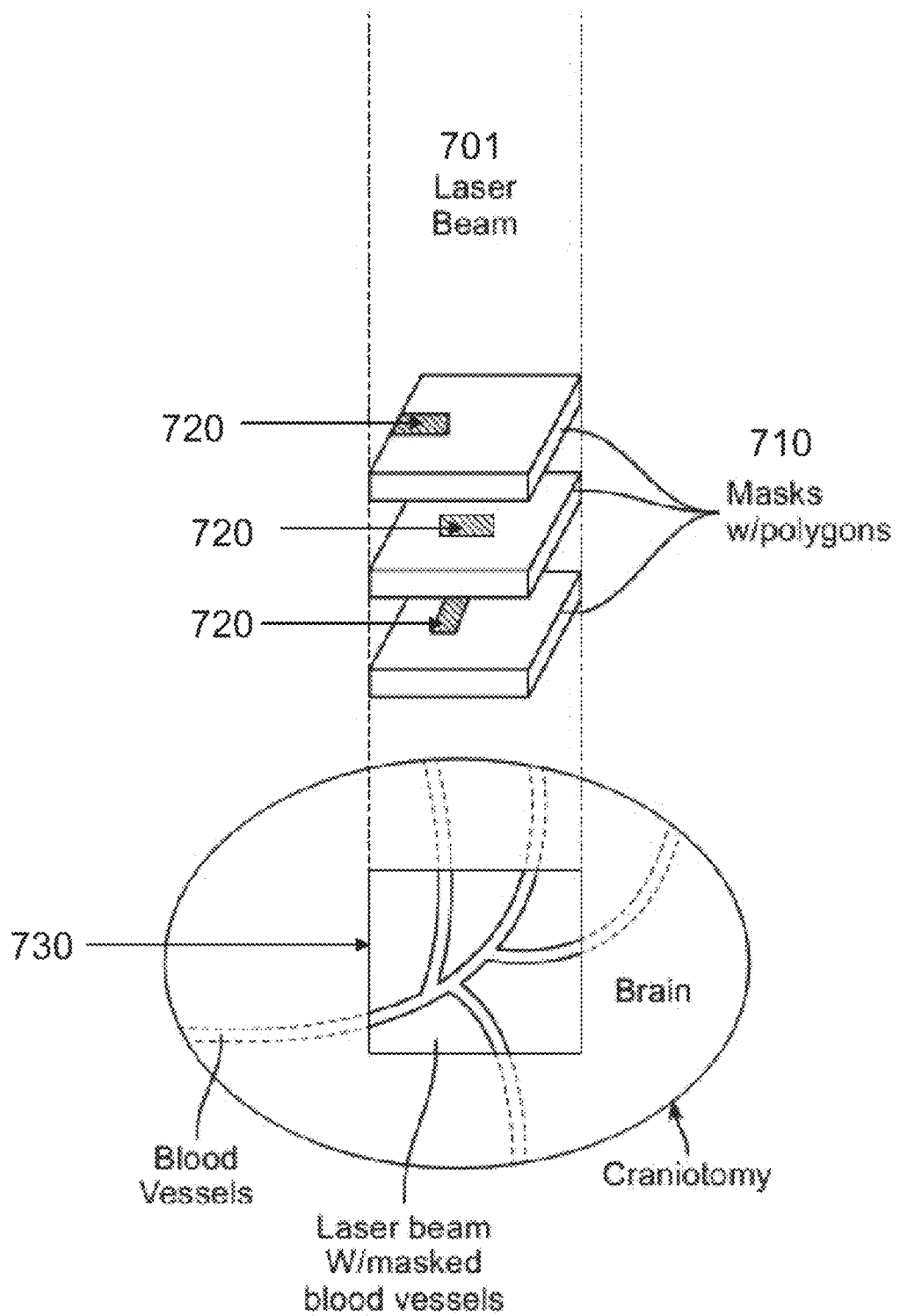
FIG. 7 schematically illustrates a plurality of masks with one or more polygons for generating a pattern, in accordance with some embodiments.

Beam shaping may be used to limit radiation damage to blood vessels nearby and/or in the vicinity of the ablation site. Beam shaping can be achieved in various ways. One method may involve introducing a mask within the beam path that spatially blocks areas where ablation is not desired. The masks may be introduced either manually or in an automated fashion. More than one mask may be used to generate a single pattern. For example, a series of masks with one or more shapes may be used to generate one or more patterns that are configured to visually and/or physically designate to a user or an operator which ablation sites are desirable and which ablation sites are not desirable (e.g., due to proximity to one or more blood vessels). In some cases, a series of masks comprising one or more basic polygons may be used to ablate a surface. For example, as shown in FIG. 7, a plurality of masks 710 may be used to generate one or more patterns 730 that are configured to visually and/or physically designate to a user or an operator which ablation sites are desirable and which ablation sites are not desirable. The plurality of masks 710 may be arranged in a lateral configuration (i.e., each mask of the plurality of masks may be positioned above and/or below another mask of the plurality of masks). The one or more patterns 730 may be generated in part based on a size, a shape, a position, and/or an orientation of one or more polygons 720 disposed on a portion of each of the plurality of masks 710. The plurality of masks 710 may comprise a first material, and the one or more polygons 720 may comprise a second material that is different than the first material. The one or more polygons 720 may be configured to permit and/or modulate a transmission of a laser beam 701 through one or more portions of the plurality of masks 710 as defined by the one or more polygons 720. The one or more patterns 730 generated using the plurality of masks 710 and the one or more polygons 720 may cover and/or expose various portions of an ablation site to prevent ablation of one or more blood vessels within the ablation site. Alternatively, a digital micromirror device (DMD) may be included in the beam path of the laser beam 701 to reflect the laser beam 710 away from one or more undesired areas comprising blood vessels.

In some cases, the system may comprise one or more optical elements that are configured to shape the laser beam. The one or more optical elements may comprise, for example, a piezoelectric mirror, a dichroic mirror, an acousto-optic deflector, a rotating mirror, an oscillating mirror, a beam expander, a collimating lens, a refractive lens, and/or a light-converging lens.

In some cases, the optical elements configured to shape the beam may be used in conjunction with (e.g., either before or after) one or more diffractive optical elements. A diffractive optical element may be an engineered element that operates by interference and diffraction of a beam to produce a predetermined distribution of light intensity on a working surface (e.g., the ablation site). The diffractive optical element may be configured to distribute laser energy across the ablation site in a desired geometric pattern. The diffractive optical element may be configured to generate a desired geometric pattern of light by redistributing the laser light and by controlling the laser beam power based on the desired pattern and the material properties of the specific layers (i.e., the dura mater, the arachnoid mater, and/or the pia mater) targeted for ablation. Ablation achieved by diffractive optical elements may produce clean and smooth lines and uniformly ablated areas with relatively high throughputs.

The diffractive optical may produce geometrical patterns of light and/or a light intensity distribution profile. In some cases, diffractive optical elements may be placed between the light source (generally a laser) and the ablation site, and the geometric patterns of light produced by the laser travelling through the diffractive optical elements may be aligned, adjusted, and/or modulated based on the position and/or orientation of the diffractive optical element. The geometric pattern of light produced by the laser travelling through the diffractive optical elements may be projected onto the ablation site and may be dimensionally scalable by varying a distance between the diffractive optical element and the working surface. In some cases, a single diffractive optical element may produce multiple light patterns. In other cases, two or more diffractive optical elements may be used to produce a plurality of light patterns. In such cases, the patterns may or may not be the same. In some cases, the diffractive optical element may transform an incoming laser beam or spot into a geometric light pattern that covers the desired target area (e.g., the ablation site or a portion of the ablation site). In some cases, the diffractive optical element may be configured to expand and/or reduce the beam spot size as required to meet the specific patterning needs.

In some cases, the diffractive optical element may be an engineered projection hologram that is configured to generate a desired ablation pattern based in part on either phase or amplitude modulation across the diffractive optical element. For example, the diffractive optical element may be a phase shift mask that is configured to provide multiple beam paths (via multiple lens thicknesses). In such cases, the desired ablation pattern may be formed by interference of the phase shifted beams. In another example, the diffractive optical element may be a phase shift mask in which the optical density of the diffractive optical element is varied (for absorption variation and phase shift). In a further example, the diffractive optical element may be an amplitude mask with diffractive arrays on the diffractive optical element through which the beams "diffract" and collectively form the desired ablation pattern by interference of individual beams.

The one or more diffractive optical elements may be selected based on the ablation site, the biological material to be ablated, a thickness of the biological material to be ablated, a desired depth of ablation, and/or a desired rate of ablation. In any case, the one or more diffractive optical elements may include a diffractive lens, a beam shaper, a diffractive line generator, a diffractive Gaussian generator, a beam splitter, a diffractive diffuser, an elliptical diffuser, a homogenizer, and/or a corrector plate.

In some cases, the system may be configured to control the beam size and raster the beam in a desired pattern along the surface of the ablation site and/or the biological material (e.g., brain tissue). The rastering may follow a path comprising a single vectorized line, or the rastering may involve following a plurality of paths over a large pattern to avoid local convolution of beam effects, such as the intermixing of ablation plumes. The spot size of the beam may be dynamically altered during the raster process in order to ablate larger or smaller ablation sites.

In some cases, rastering may involve directing the laser to follow and/or sweep across a scan line. The scan line may correspond to a desired ablation pattern. The scan line may or may not be an actual line. In some cases, the scan line may comprise one or more scan lines.

Rastering may be performed according to a raster-type scan pattern. In a raster-type scan pattern, a series of substantially horizontal and substantially parallel scan lines may be produced from an upper horizontal scan line, proceeding downward with a multiplicity of intermediate horizontal scan lines, to a lower horizontal scan line, in order to uniformly cover the desired scan area. In raster scanning, the laser beam may sweep horizontally left-to-right at a steady rate, then blank and rapidly move back to the left, where it may turn back on and sweep out the next line. In such cases, rastering may involve sweeping a laser beam across the ablation site, one row at a time from top to bottom. As the laser beam moves across each row, the beam intensity may be turned on and off to create a pattern of illuminated spots. In addition to a single scan line and the raster-type pattern, other types of scan patterns may also be implemented for ablation of the dura mater, the arachnoid mater, and/or the pia mater, such as an X-shaped pattern, a Lissajous pattern, and/or a curvilinear pattern.

The techniques disclosed herein for producing a desired ablation pattern (e.g., masking, beam shaping, diffracting, and raster scanning) may be used in conjunction with one another (e.g., by interlacing or by concurrently using each technique) to achieve higher resolution, speed, or precision during ablation of the dura mater, the arachnoid mater, and/or the pia mater. In some cases, masking and scanning may be combined in order to achieve a higher resolution, speed or specificity, either by interlacing or concurrently using both masking and scanning techniques.

As described above, the system may be configured to evade surface features of the tissue (e.g. blood vessels). In some examples, the system may be configured to initially acquire information about the location of the blood vessels. This may be achieved by taking a photograph of the tissue or by scanning the tissue with a probing beam (e.g. light with a wavelength that gives contrast to blood vessels in relation to the surrounding tissue). The system may be configured to store the photograph and subsequently modulate one or more properties of the laser beam and/or utilize a mask, one or more diffractive optical elements, or a raster scan to generate and execute an ablation pattern that is based on the spatial information provided by the photograph. Alternatively, the system may be configured to move the laser beam in a predetermined pattern and to combine the laser beam with a probing beam that moves in the same pattern and whose position is slightly advanced against the laser beam used for ablation. In such cases, if the probing beam detects a structure (e.g., a blood vessel) that is undesirable for ablation, the system may be configured to briefly blank (i.e., turn off) the ablation beam until the probing beam or the results from the probing beam indicate that the combined beams are no longer scanning over an undesirable structure.

Figure 8:
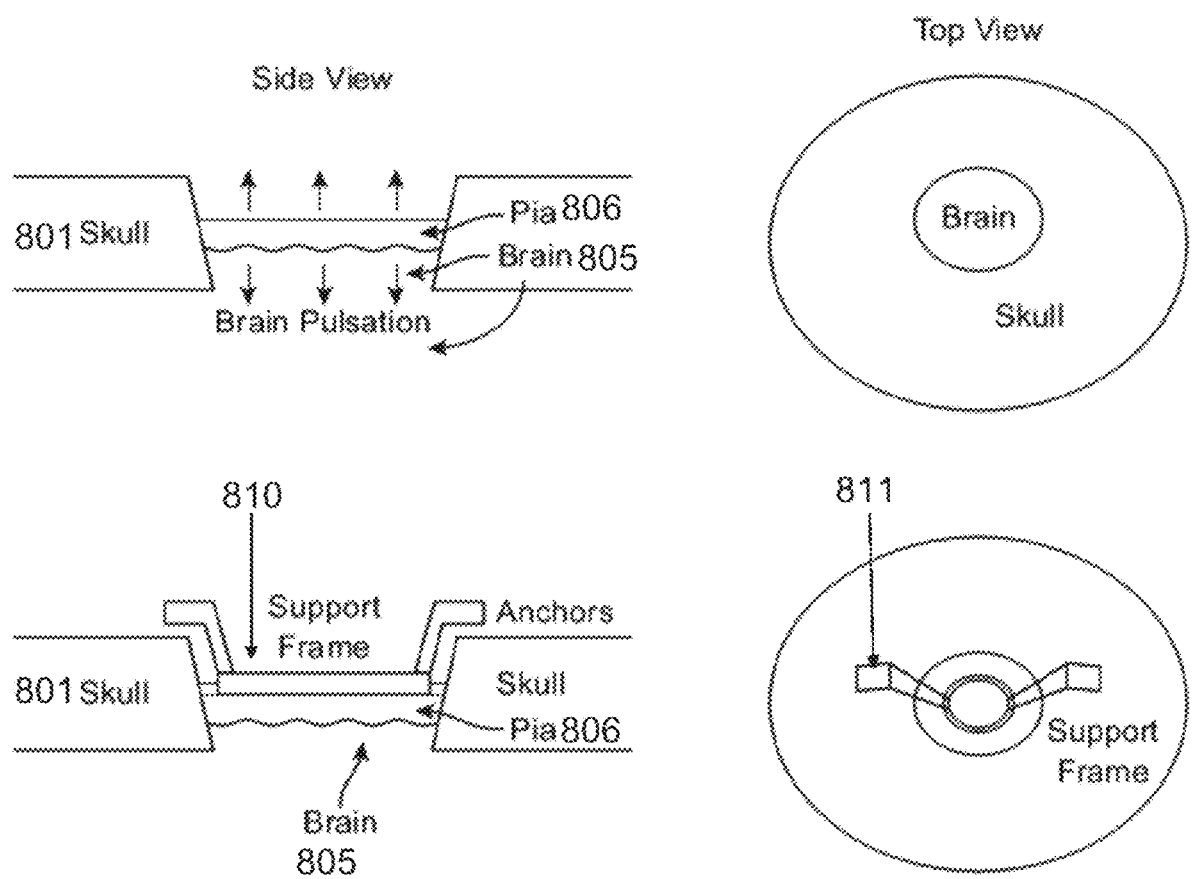
FIG. 8 schematically illustrates a support frame configured to reduce or mitigate a pulsation or movement of brain tissue, in accordance with some embodiments.

In some cases, the system may be configured to adjust and/or compensate for general tissue movement including non-linear distortion not limited to translation. Pulsation of the tissue during ablation may be a factor that impacts the accuracy of ablation. In some cases, pulsation may be mitigated by physically grab and/or hold the tissue in place. This may be achieved through the application of a physical ring or a support frame that is attached to the brain around the ablation site. The physical ring and/or the support frame may be attached to the ablation site by a physical force (e.g., the application of a vacuum or the piercing of the pia) or a chemical bond (e.g., a superglue or one or more proteins that are configured to promote attachment). FIG. 8 illustrates an example of a support frame 810 that may be configured to attach to the brain around the ablation site using one or more physical anchors 811. The physical anchors 811 may attach the support frame 810 to a skull 801 of a subject. The support frame 810 may be configured to reduce and/or mitigate a pulsation or movement of brain tissue 805. The brain tissue 805 may comprise a pia mater membrane 806 of the subject's brain. The support frame 810 may be placed adjacent to and/or above the pia mater membrane 806 of the subject's brain. In other cases, the system may be configured to use image recognition to track a movement of a surface of the dura mater, the arachnoid mater, and/or the pia mater, or to alter the focus and scan position to adjust targeting accuracy. Alternatively, the system may be configured to range a surface or a portion of the dura mater, the arachnoid mater, and/or the pia mater with a laser pulse and/or an ultrasonic pulse to track the vertical and/or horizontal tissue position and topological expansion and/or contraction of the surface of the dura mater, the arachnoid mater, and/or the pia mater. Ranging the surface with a laser or ultrasonic pulse to track the vertical tissue position and topological expansion and/or contraction may involve transposing the X and Y coordinates of a raster pattern and adjusting the focus point or scan position to compensate for the vertical and/or horizontal movement of brain tissue as the ablation is being performed.

In some cases, the system may be configured to use cauterization equipment or beam tuning to address bleeding that occurs after ablation of a surface or a portion of the dura mater, the arachnoid mater, and/or the pia mater. In some cases, the system may be configured to use the laser to cauterize any ablated tissue. In such cases, the system may be configured to provide additional shots or pulses from the laser itself, or if operating in a post-ablation threshold energy level, to tune the energy of the laser down below the ablation threshold. In other cases, a second laser may be used to target the area along the same beamline as the first laser, or along a second beamline nearby the first beamline of the first laser. The second laser may be configured to locally heat the ablation site. The second laser may be an infrared (IR) laser.

In application, the systems provided herein may be configured to implement a method for applying the laser to microsurgery including BMI (brain machine interface) applications. The method may comprise conducting a standard surgical preparation of the head, including shaving the area and conducting a standard craniotomy over the ablation site or desired ablation region using a standard surgical drill. Once the dura (mater) is exposed, the ablation site may be cleaned up as desired. The method may further comprise removing the dura mater either using standard surgical techniques or by applying the laser system to ablate a surface or a portion of the dura mater, much like how the laser may ablate a surface or a portion of the arachnoid mater and/or the pia (mater) as described elsewhere herein. The dura mater may also be removed surgically in a traditional manner by cutting and/or peeling the dura mater away. One advantage of using a laser for removal may be tighter and more precise targeting of the desired area to ablate or remove from the dura mater.

The method may further comprise bringing the laser into position or aligning the laser relative to the ablation site for ablation of the desired ablation site once the dura mater and other underlying brain tissue or biological matter is exposed. In some cases, the method may comprise activating a targeting laser or other targeting instrument to identify the desired surface or portion of the dura mater, arachnoid mater, and/or pia mater for ablation. The method may further comprise operating and/or controlling the laser in either an automated or manual fashion.

In an automated control fashion, instrumentation such as the aforementioned ultrasonic or laser ranging or image recognition technologies may be applied to identify total reduction of tissue. Such testing may be destructive or nondestructive to the underlying tissue, and may be contact or non-contact. In some examples, a probe may be brought into contact with the brain tissue (e.g., the dura mater, the arachnoid mater, the pia mater, or other biological material underneath the pia mater) to measure either mechanical forces, fundamental changes in brain tissue mechanical properties, or changes in electrical properties or signals. The measurements may be automatically fed-back to the system such that the system is configured to adjust the laser position, laser power, mode of operation, and/or a property of the laser pulses (e.g., pulse energy, wavelength, pulse duration, pulse width, pulse repetition frequency, pulse energy density, average power, and/or beam spot size). Such feedback may facilitate automated control over how deep and where the laser ablates.

In a manually controlled operation, the laser may be moved and pulsed through direct input from a user or an operator. The user or operator may control targeting, firing, and modulation of one or more laser properties or parameter. Operation of the laser may involve a combination of both automated and manual manipulation. In some cases, targeting may be performed through the use of manual controls, such as joysticks, keyboard keys, or a point-and-click system. Laser parameters and firing may be manually controlled through the use a computer software interface, or may be automatically adjusted via optical or other feedback (e.g., auditory or haptic feedback) from the laser ablation system itself. For example, optical recognition may be applied to a moving image of the ablation site to obtain fixed registration, or a pen with a fiducial marker may be employed by the surgeon to directly touch the surface of the brain and enable ablation. Such a pen may comprise a retroreflector, a different color, or an active strobe to encode its position for marking, and may provide force or electrical feedback as it touches the brain to allow the surgeon to ablate tissue immediately or via a trigger on the "pen" when it is in contact with cortical tissue. Such a pen may effectively minimize the size of the ablation device itself, while the surgical ablation system presides overhead.

In some cases, the systems provided herein may be configured to implement a method for applying the laser to penetrate a biological membrane (e.g., the dura mater, the arachnoid mater, and/or the pia mater). The method may comprise identifying a target region, determining a thickness of the target region, photodisrupting the target region at an intensity sufficient to cause disruption (e.g., thermal decomposition) of the membrane, and discontinuing irradiation when a target depth is reached. In some cases, disrupting the membrane may involve exposing the membrane to thermal energy from a laser beam and/or one or more laser pulses to subsequently evaporate or sublimate at least a portion of the biological membrane.

In some cases, the method may comprise targeting the ablation site to identify the desired surface or portion of the dura mater, arachnoid mater, and/or pia mater for ablation.

Targeting of the ablation site may be performed using one or more support devices. Such support devices may allow for remote operation and/or targeting of the site to be ablated, and/or remote control of ablated volumes on the fly (e.g., during operation). In some cases, the one or more support devices may comprise a camera system. For example, a camera system may be mounted to or used in tandem with the laser. The camera position may be directly linked to the laser targeting system on a display, which may be configured to allow a user to define or select one or more areas to be lased on the display screen. The camera may be operatively coupled to the laser targeting system and may allow a user or operator to define, draw out, or outline the desired surface or portion of the dura mater, arachnoid mater, and/or pia mater to be lased on a screen or display. Alternatively, a user or operator may bring a targeting instrument into the field of view. In such cases, the targeting instrument may be configured to use one or more user inputs to outline the surface or portion of the dura mater, arachnoid mater, and/or pia mater for ablation and to adjust the position and/or orientation of the laser used for ablation.

Targeting may also occur outside of the operation itself, using traditional methods such as mounting fiducial markers on the skull. Such targeting techniques may be combined with other techniques such as magnetic resonance imaging (MRI) or functional magnetic resonance imaging (fMRI) to determine target lasing positions. In such cases, the system may be configured to automatically or manually detect fiducials and to self-target the desired position with an accuracy sufficient to perform ablation without damaging nearby blood vessels. In some examples, computer vision may be used in combination with one or more motors or galvanometers to align the laser field with the fiducial marks. Alternatively, a fiducial raster pattern may be generated using the alignment lasers to manually align the laser field with the fiducial markers.

Figure 2:
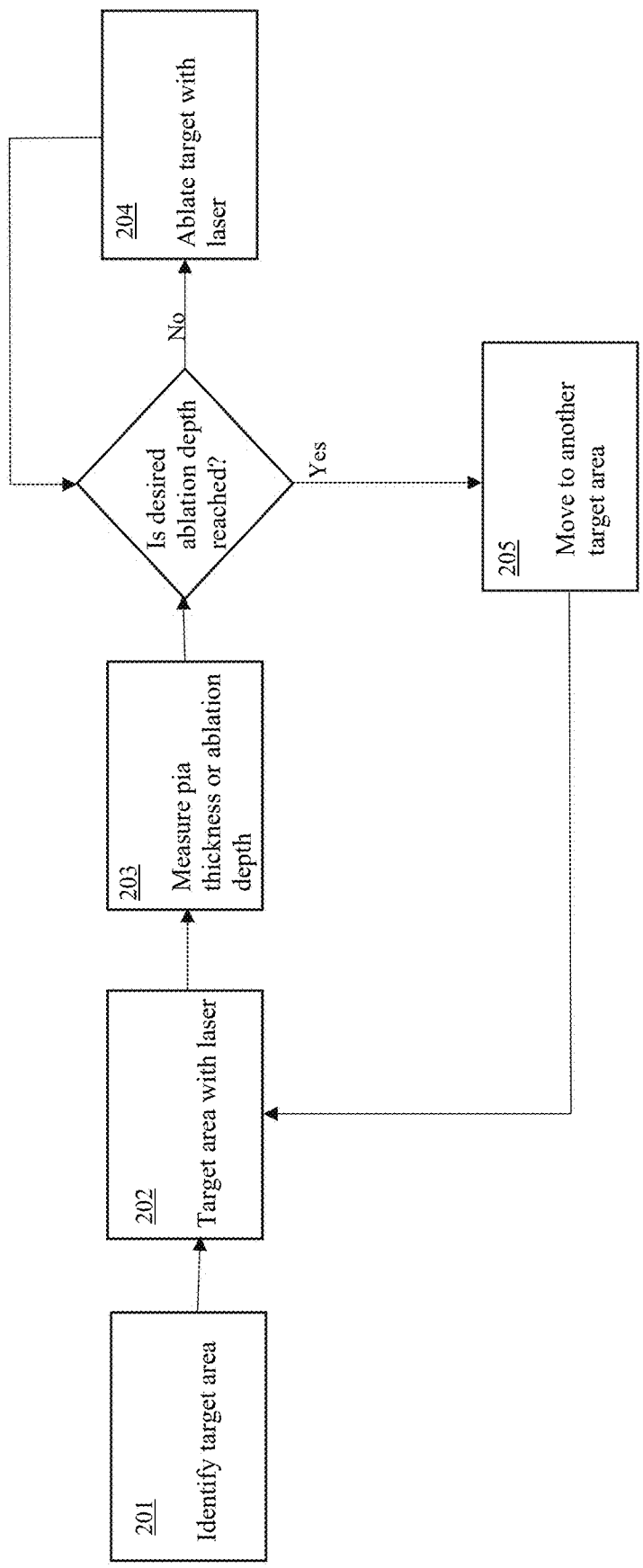
FIG. 2 schematically illustrates a laser feedback subsystem for determining if sufficient biological material has been ablated, in accordance with some embodiments.

FIG. 2 illustrates a method that may be implemented by a laser feedback subsystem to determine if sufficient material (e.g., tissue) has been ablated, in accordance with some embodiments. Methods for detection of the material thickness prior to and during the ablation process may include, without limitation, ultrasonic measurements, interferometry, confocal microscopy, changes in surface displacement under a calibrated force, phase contrast, low angle contrast, backscatter imaging, or visual changes in a surface appearance and/or a texture of the material. The laser feedback subsystem may be a subsystem of the laser ablation system. The laser ablation feedback subsystem may be configured to adjust and/or modulate one or more lasers of the laser ablation system to control cutting and/or ablation of the dura mater, arachnoid mater, and/or the pia mater based on a measurement of a thickness of the pia mater and/or a depth of ablation. As shown in FIG. 2, in a first operation 201, the laser feedback subsystem may be configured to identify a target area for ablation. Next, in a second operation 202, the laser feedback subsystem may be configured to target the target area with a laser. Afterwards, in a third operation 203, the laser feedback subsystem may be configured to measure a thickness of the pia or to measure an ablation depth. If a desired ablation depth is not yet reached, the laser feedback subsystem may be configured to ablate the target area with a laser in a fourth operation 204. The target area may be ablated continuously by the laser or may be ablated with one or more controlled pulses generated by the laser. If the desired ablation depth is reached, the laser feedback subsystem may be configured to move to another target area in a fifth operation 205. Afterwards, the laser feedback subsystem may be configured to repeat one or more of operations 202, 203, 204, and 205 for each target area targeted for ablation.

In some cases, targeting may also involve gross repositioning of the laser itself. For example, repositioning may not be totally automated but can be manual to obtain a large area coverage. The repositioning may or may not result in the targeting of an ablation site that overlaps with a previously targeted ablation site. In some cases, targeting may involve repositioning the laser over a previously targeted ablation site but at a different rotation or angle. In other cases, targeting may involve using beam shaping in combination with masking and/or beam diffraction to ablate vertical structures or even underhang structures, which may include structures located underneath nearby blood vessels. In some cases, repositioning may fall outside of a standard measurement loop. In some cases, repositioning may be implemented as part of a "global" feedback cycle or loop, or one or more smaller feedback cycles or loops of such "global" feedback cycle or loop, as illustrated in FIG. 2.

In surgical application it may not be necessary to remove all material from an ablation site or to remove an entire layer (i.e., the dura mater, the arachnoid mater, and/or the pia mater). A portion or surface of the dura mater, the arachnoid mater, and/or the pia mater layers may be partially removed so as to thin the layers globally, perforated, or cut in a targeted fashion so that certain structures are removed preferentially. Ablation may also occur deep into tissue underneath a top layer of the dura mater, the arachnoid mater, and/or the pia mater. In some cases, one or more layers may be partially removed to thin the layer globally, perforated, or cut in a targeted fashion so that certain structures are removed preferentially. Such structures may include vascular or any other regions of interest, depending on the nature of the surgery. Given the need, the ablation may also occur deeper into tissue than the target layer.

In some cases, the systems disclosed herein may be configured to thin the meninges (i.e., the dura mater, the arachnoid mater, and/or the pia mater) to a constant thickness or to a varying thickness. Thinning the meninges may involve removal of at least a portion of the meninges or a portion of the surface of the meninges. Removal of at least a portion of the meninges may result in a reduction in membrane thickness of the dura mater, the arachnoid mater, and/or the pia mater. A reduction in membrane thickness of the dura mater, the arachnoid mater, and/or the pia mater may facilitate the attachment of electrically recording probes to the surface of the brain and/or facilitate optical interrogation of the brain using one or more microwires and/or microelectrodes. In some cases, the reduction in membrane thickness of the dura mater, the arachnoid mater, and/or the pia mater may facilitate controlled implantation of microelectrodes. The amount of tissue removed during thinning may be adjusted based on natural thickness differences in the underlying matter or may be adjusted based on a curvature of the tissue. In some cases, thinning may be used to shape the tissue by creating or removing global or local tissue curvature. The targeted depth (i.e., the depth of ablation or penetration of the laser) may depend on a number of factors, including depth of underlying tissue structures such as blood vessels or cortical layers. The system may be configured to adjust the amount and/or rate of thinning by adjusting or modulating one or more properties of the laser (e.g., mode of operation, pulse energy, wavelength, pulse duration, pulse width, pulse repetition frequency, pulse energy density, average power, and/or beam spot size). In some cases, the system may be configured to adjust one or more properties of the laser based on the material type (e.g., whether the ablation site comprises a surface or a portion of the dura mater, the arachnoid mater, and/or the pia mater) and the thickness to be ablated.

The systems and methods disclosed herein may be implemented to facilitate an insertion of a high aspect ratio structure into a human body or an anatomical structure or component thereof. The systems and methods disclosed herein may be implemented to facilitate an insertion of a high aspect ratio structure into or through a biological material such as a tissue or a membrane. As described above, the high aspect ratio structures may comprise one or more medical devices or instruments configured to be inserted into a human body or an anatomical structure or component thereof. The high aspect ratio structures may comprise one or more medical devices or instruments that are sized and/or shaped for insertion into or through a biological material such as a tissue or a membrane. The high aspect ratio structures may be configured to conduct a current and/or establish a communication pathway between a biological material and an external computing device, medical device, or medical instrument. In some cases, the high aspect ratio structures may comprise, for example, a probe, a microwire, and/or a microelectrode. In some cases, the high aspect ratio structures may comprise a brain machine interface (BMI). The brain machine interface may comprise a device that is configured to establish a direct communication pathway between a brain and an external device. In some cases, the brain machine interface may be configured to translate neuronal information into commands capable of controlling external software or hardware.

In one non-limiting example, the systems and methods of the present disclosure may be used to aid in the insertion of a brain machine interface (BMI) into a brain. To successfully insert a BMI into the brain, it may not be necessary to remove all of the pia over the target area. One possibility may be to weaken the pia and/or remove only a portion of the surface of pia. This may be done using a grid of incisions, for example, by lasing a square grid with the same pitch or a similar pitch as the probes in a BMI array, or by a general thinning of a desired portion of the pia by laser ablation. In some cases, a force exerted on a surface of the pia by the BMI may collapse a surface of the pia and allow for easy penetration. If a partially removed pia has an external force exerted on it by the BMI, at least a portion of the pia may collapse and allow for easy penetration. In some cases, a lased grid may match an insertion footprint of the BMI, which may be obtained through a process such as imaging, or based on the device's design specifications. Alternatively, it may be possible to exploit the fact that some BMI are comprised of high aspect ratio features. These high aspect ratio features may penetrate the pia at select locations, which make up only a small fraction of the overall surface area of the pia. If these select penetration locations can be successfully predicted, it may be sufficient to only remove the pia in those spots. This may help to reduce the risk of other surgery complications, for example infections. The BMI itself may also contain fiducial markers allowing for targeting of the beam at one or more desired positions. This could be done as described above with the same types of technologies employed by the tissue touching "pen", and in addition using aspects such as fluorescence, phosphorescent, reflective, or otherwise high contrast markings on the tips of the probe. The probe can engage with the surface of the brain, and lasing can commence as the system detects placement. In some cases, the probe may be retracted once the image is acquired and the tissue is ablated. In some cases, the probe itself may leave a marking on the tissue for positional acquisition of the lasing site, after which the probe may be physically removed, and the markings removed by lasing. In some cases, the BMI may comprise one or more high aspect ratio structures (e.g., a microwire, a microelectrode, or a probe). These high aspect ratio structures may penetrate the pia at select locations which make up only a small portion of the overall pia.

In some cases, the one or more layers (e.g., the dura mater, the arachnoid mater, and/or the pia mater) may be cut in a targeted fashion to release blood vessels on the surface of the brain. Such targeted cutting may facilitate the decoupling of large blood vessels from the underlying tissue. In some cases, targeted cutting may allow the system to target other structures such as soft tissues or hard tissues for selective ablation. In other cases, targeted cutting may be used to generate a hole, incision, slit, or other cavity in the dura mater, the arachnoid mater, and/or the pia mater that matches or corresponds to the size and/or shape of an implanted BMI device such as a microwire or a microelectrode. Generating a hole, incision, slit, or other cavity in the dura mater, the arachnoid mater, and/or the pia mater that corresponds to the size and/or shape of an implanted BMI device such as a microwire or a microelectrode may help to minimize damage to surrounding biological material when the BMI device is inserted through the one or more membranes. Alternatively, targeted cutting may also be used to remove, partially remove, and/or biopsy a desired portion of the dura mater, the arachnoid mater, and/or the pia mater.

In some embodiments, the system may be configured to modulate one or more properties of the laser to control a depth at which cutting or ablating occurs. In some cases, cutting or ablating the dura mater, the arachnoid mater, and/or the pia mater may involve forming an overlapping, contiguous, or near contiguous series of micro pores along a line or pattern to be cut. In such cases, the pulse energy and/or pulse duration may be adjusted such that each micro pore is of substantially the same depth (e.g., 0.05 mm deep, 0.1 mm deep, 0.25 mm deep, 0.5 mm deep, 1 mm deep, 1.5 mm deep, 2 mm deep, 2.5 mm deep, or other suitable depth) to ensure a uniform depth per pass and to ensure that the cut is not made too deep (which would endanger underlying tissues). If a deeper cut is desired, a user or an operator may trace over a first cut with one or more additional passes of the laser to make the first cut deeper. In some embodiments, the system may be configured to adjust the pulse energy, the wavelength of pulses, pulse duration, pulse width, pulse repetition frequency, pulse energy density, average power, and/or beam spot size in order to increase or decrease the cut depth.

Any of the systems or methods disclosed herein may be applied to a number of different use cases. Many biological and anatomical systems may contain soft and sensitive tissues that are protected by an outer membrane that is tough and fibrous. Penetrating such a membrane may be challenging because the force of the penetration may not be fully absorbed by the membrane and may be transmitted to biological material below, thereby risking damage to the underlying biological material (e.g., brain tissue). Further, such forceful penetration may damage the membrane and therefore leave an opening that is larger than what would have been necessary to insert a brain machine interface (BMI). Additionally, these forces may exceed the maximum permissible force that can be absorbed by the BMI that is introduced into the tissue or membrane.

In some cases, the systems or methods disclosed herein may be applied to one or more membranes (e.g., a tympanic membrane) in the ear. The inner ear may be filled with a liquid (Perilymph) that transports sound waves along receptor cells. The liquid may be contained within the inner ear by two membranes, a primary tympanic membrane and a secondary tympanic membrane. While the primary tympanic membrane may be used to mechanically couple sound waves, the secondary tympanic membrane may not be covered and may be used as a pressure equalizer. The primary tympanic membrane and the secondary tympanic membrane may be configured as a gateway to deliver drugs directly into the inner ear. The primary tympanic membranes and the secondary tympanic membranes may be very thin (~100 um in humans) and traumatic perforation of the primary and secondary tympanic membranes can lead to a loss of hearing. In some cases, the systems and methods disclosed herein may be configured and/or implemented to cut and/or ablate the primary tympanic membrane and the secondary tympanic membrane with one or more lasers to facilitate access to one or more portions of the inner ear. Cutting and/or ablating the primary and secondary tympanic membranes at a specific spot without exerting force on the inner ear may help with interrogating one or more components the inner ear (e.g., auditory ossicles, semicircular canals, a vestibule, a vestibulocochlear nerve, a cochlea, an auditory tube, an oval window, a tympanic cavity, etc.) and with developing treatments.

In some cases, the systems and methods disclosed herein may be configured and/or implemented to cut and/or ablate one or more membranes of an amniotic sac. The amniotic sac may comprise a thin membrane that contains amniotic fluid and a fetus during pregnancy. The amniotic sac may be punctured in a procedure called amniocentesis, a procedure that may help to prevent and diagnosis trisomic diseases (e.g. Down syndrome), but may also be risky for a mother and her child. Complications associated with amniocentesis may include preterm labor, fetal trauma, and/or immune system problems for the mother (e.g., Rh disease). Further, penetrating the thin membrane of the amniotic sac with a sharp object may disturb the fetus and may present a risk of over penetration when a needle ruptures the membrane or a similar penetrating device (e.g., a microwire and/or a microelectrode) moves into an amniotic cavity at high speed. The systems and methods disclosed herein may be configured and/or implemented to cut and/or ablate one or more membranes of an amniotic sac using one or more lasers in a manner that mitigates the risk of over penetrating and damaging the fetus when a microwire and/or a microelectrode is inserted through the one or more membranes of the amniotic sac. For example, the systems and methods disclosed herein may be configured and/or implemented to cut and/or ablate one or more membranes of an amniotic sac to weaken (i.e., thin to a desired thickness) the one or more membranes for easier penetration or to generate a hole, incision, slit, or other cavity in the one or more membranes that corresponds to the size and/or shape of an implanted BMI device (e.g., a microwire or a microelectrode), thereby minimizing damage to surrounding biological material when the BMI device is inserted through the one or more membranes.

In some cases, the systems and methods disclosed herein may be applied to one or more membranes or tissues of a heart in the context of cardiac surgery. For example, the systems and methods disclosed herein may be configured and/or implemented to cut and/or ablate one or more membranes or tissues of a heart using one or more lasers in a manner that mitigates the risk of over penetrating and damaging the one or more membranes or tissues of the heart when a microwire and/or a microelectrode is inserted through the one or more membranes or tissues of the heart. In some examples, the systems and methods disclosed herein may be configured and/or implemented to cut and/or ablate one or more membranes or tissues of the heart to weaken (i.e., thin to a desired thickness) the one or more membranes or tissues for easier penetration, or to generate a hole, incision, slit, or other cavity in the one or more membranes or tissues that corresponds to the size and/or shape of an implanted BMI device (e.g., a microwire or a microelectrode), thereby minimizing damage to surrounding biological material (e.g., heart tissue) when the BMI device is inserted through the one or more membranes or tissues of the heart.

In some cases, the system may be configured to implement one or more feedback methods to compensate for pulsation of heart tissues and to accurately target one or more portions of the heart for targeted cutting and/or laser ablation. In such cases, the system may be configured to operate in an automatic or a manual configuration. Additionally, due to large amounts of blood flowing in and through the heart, the system may be configured to perform vasculature identification and to evade blood vessels, arteries, and/or veins during targeted cutting or laser ablation. In some cases, the system may be configured to use a second laser or to modulate one or more properties of the primary laser (e.g., reducing a power setting of the primary laser) to coagulate tissue and to address bleeding that occurs after ablation.

In some cases, the systems and methods disclosed herein may be applied to one or more membranes (e.g., a myelin sheath) of a nerve in the context of peripheral nervous implants. Peripheral nervous implants may suffer from an inability to penetrate a thick myelin sheath which surrounds nerves. Further, excessive damage to these sheaths during insertion of a microwire and/or an electrode can impair the function of the microwire or the electrode. In some examples, the systems and methods disclosed herein may be configured and/or implemented to cut and/or ablate the myelin sheath of a nerve to weaken (i.e., thin to a desired thickness) the myelin sheath for easier penetration, or to generate a hole, incision, slit, or other cavity in the myelin sheath that corresponds to the size and/or shape of an implanted BMI device (e.g., a microwire or a microelectrode), thereby minimizing damage to surrounding biological material (e.g., nerve fibers) when the BMI device is inserted through the myelin sheath of the nerve. In some cases, the system may be configured to use a laser to remove at least a portion of the myelin sheath in a structured fashion. In such cases, the system may be configured to remove at least a portion of the myelin sheath by partially thinning the myelin sheath but not totally removing. Such a structure removal may allow for sampling of pulses through the myelin sheath and may facilitate implantation of a BMI through the myelin sheath while minimizing damage to nearby biological materials or other portions of the nerve. In some examples, the system may be configured to use a laser to cut and/or ablate the myelin sheath such that one or more structured holes are generated in the myelin sheath. The one or more structured holes may allow for insertion of a patterned array of electrodes into the myelin sheath while minimizing an amount of excess sheath removed through cutting and/or laser ablation. In some examples, the system may be configured to use a laser to cleanly sever damaged nerve sections and/or to aid in surgical rejoining of one or more severed portions of a nerve while minimizing damage to nearby biological materials and/or other portions of the nerve. In some cases, the system may be configured to surgically cauterize the myelin sheath and/or an end of the nerve by using a secondary laser or by modulating a primary laser to operate at a lower power.

Computer Systems

Figure 3:
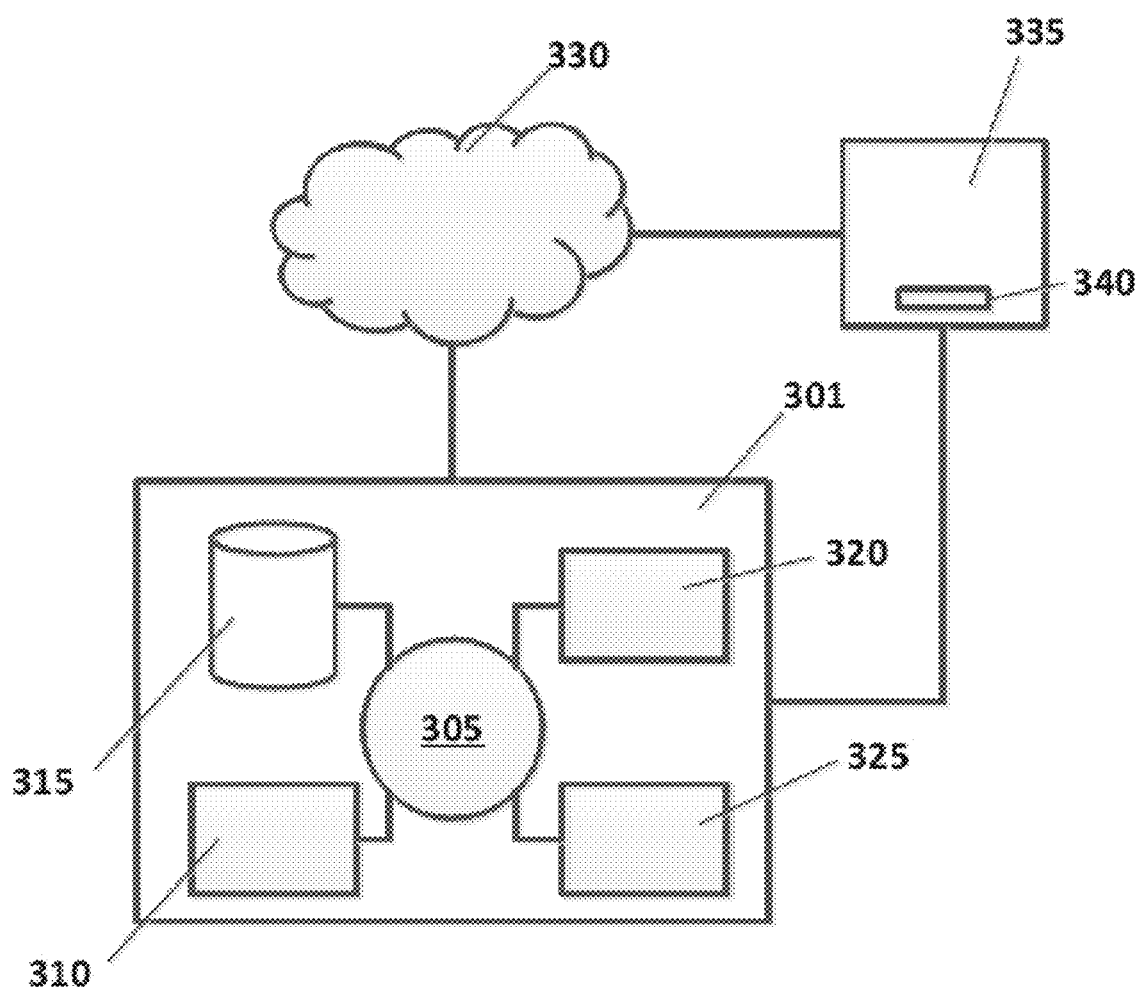
FIG. 3 schematically illustrates a computer system that is programmed or otherwise configured to implement methods provided herein.

Another aspect of the present disclosure provides computer systems that are programmed or otherwise configured to implement methods for fabricating the thermal management devices disclosed herein. FIG. 3 shows a computer system 301 that is programmed or otherwise configured to implement a method for cutting and/or ablating a surface or a portion of the dura mater, the arachnoid mater, and/or the pia mater using a laser. The computer system 301 may be an electronic device of a user or a computer system that is remotely located with respect to the electronic device. The electronic device can be a mobile electronic device.

The computer system 301 includes a central processing unit (CPU, also "processor" and "computer processor" herein) 305, which can be a single core or multi core processor, or a plurality of processors for parallel processing. The computer system 301 also includes memory or memory location 310 (e.g., random-access memory, read-only memory, flash memory), electronic storage unit 315 (e.g., hard disk), communication interface 320 (e.g., network adapter) for communicating with one or more other systems, and peripheral devices 325, such as cache, other memory, data storage and/or electronic display adapters. The memory 310, storage unit 315, interface 320 and peripheral devices 325 are in communication with the CPU 305 through a communication bus (solid lines), such as a motherboard. The storage unit 315 can be a data storage unit (or data repository) for storing data. The computer system 301 can be operatively coupled to a computer network ("network") 330 with the aid of the communication interface 320. The network 330 can be the Internet, an intranet and/or extranet, or an intranet and/or extranet that is in communication with the Internet. The network 330 in some cases is a telecommunication and/or data network. The network 330 can include one or more computer servers, which can enable distributed computing, such as cloud computing. The network 330, in some cases with the aid of the computer system 301, can implement a peer-to-peer network, which may enable devices coupled to the computer system 301 to behave as a client or a server.

The CPU 305 can execute a sequence of machine-readable instructions, which can be embodied in a program or software. The instructions may be stored in a memory location, such as the memory 310. The instructions can be directed to the CPU 305, which can subsequently program or otherwise configure the CPU 305 to implement methods of the present disclosure. Examples of operations performed by the CPU 305 can include fetch, decode, execute, and writeback.

The CPU 305 can be part of a circuit, such as an integrated circuit. One or more other components of the system 301 can be included in the circuit. In some cases, the circuit is an application specific integrated circuit (ASIC).

The storage unit 315 can store files, such as drivers, libraries and saved programs. The storage unit 315 can store user data, e.g., user preferences and user programs. The computer system 301 in some cases can include one or more additional data storage units that are external to the computer system 301, such as located on a remote server that is in communication with the computer system 301 through an intranet or the Internet.

The computer system 301 can communicate with one or more remote computer systems through the network 330. For instance, the computer system 301 can communicate with a remote computer system of a user (e.g., an end user, an operator, a surgeon, etc.). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 301 via the network 330.

Methods as described herein can be implemented by way of machine (e.g., computer processor) executable code stored on an electronic storage location of the computer system 301, such as, for example, on the memory 310 or electronic storage unit 315. The machine executable or machine readable code can be provided in the form of software. During use, the code can be executed by the processor 305. In some cases, the code can be retrieved from the storage unit 315 and stored on the memory 310 for ready access by the processor 305. In some situations, the electronic storage unit 315 can be precluded, and machine-executable instructions are stored on memory 310.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 301, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 301 can include or be in communication with an electronic display 335 that comprises a user interface (UI) 340 for providing, for example, a portal for monitoring the cutting and/or ablation of a surface or a portion of the dura mater, the arachnoid mater, and/or the pia mater of a target object (e.g., a human or an animal). The portal may be provided through an application programming interface (API). A user or entity can also interact with various elements in the portal via the UI. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 305. The algorithm may be configured to control the computer system to bring a laser into position or align the laser relative to a target area or an ablation site for ablation of a desired ablation site once the dura mater or other underlying brain tissue or biological matter (e.g., the arachnoid mater or the pia mater) is exposed. In some cases, the algorithm may be configured to control the computer system to activate a targeting laser or other targeting instrument to identify the desired surface or portion of the dura mater, arachnoid mater, and/or pia mater for ablation. The algorithm may be configured to control the computer system to operate and/or control the laser in either an automated or manual fashion to perform ablation on a surface or a portion of the dura mater, arachnoid mater, and/or pia mater. In some cases, the algorithm may be configured to control the computer system to modulate one or more properties of the laser (e.g., mode of operation, pulse energy, wavelength, pulse duration, pulse width, pulse repetition frequency, pulse energy density, average power, and/or beam spot size). In such cases, the algorithm may be configured to control the computer system to adjust a rate of ablation and/or to adjust a depth or an amount of ablation.

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the present disclosure described herein may be employed in practicing the invention. It is intended that the following claims define the scope of the present disclosure and that methods and structures within the scope of these claims and their equivalents be covered thereby.

What is claimed is:

1. A method of penetrating a biological membrane in proximity to a subject's brain, comprising:
   (a) identifying a target region of the biological membrane;
   (b) photodisrupting the target region to a target depth to remove or ablate at least a portion of the biological membrane to expose underlying brain tissue, wherein the biological membrane is a pia mater, wherein the photodisrupting comprises using at least one light source and one or more optical elements, and wherein the at least one light source emits one or more pulses with a pulse energy density from about 1 $\mu J/cm^2$ to about 100 $J/cm^2$; and
   (c) inserting an implantable device comprising one or more high aspect ratio structures through the photodisrupted target region into a tissue below the biological membrane, wherein the tissue below the biological membrane comprises the underlying brain tissue, wherein the implantable device is configured to receive or transmit signals to the subject's brain.

2. The method of claim 1, further comprising removing one or more particles from (i) the target region or (ii) air surrounding the target region.

3. The method of claim 2, further comprising using a vacuum or a blower to remove the one or more particles from (i) the target region or (ii) the air surrounding the target region.

4. The method of claim 2, wherein the one or more particles are removed by flowing a gas across the target region.

5. The method of claim 4, wherein the gas humidifies one or more tissue regions in the target region to prevent the one or more tissue regions from drying out.

6. The method of claim 4, wherein the gas modulates an ablation characteristic or tissue response of one or more tissue regions in the target region.

7. The method of claim 1, wherein the one or more optical elements are configured to spatially block or redirect light from the at least one light source to (i) avoid ablating one or more blood vessels in proximity to the target region and (ii) minimize bleeding in or near the target region.

8. The method of claim 1, wherein at least a portion of the one or more optical elements are optically aligned with the at least one light source.

9. The method of claim 1, wherein the one or more optical elements comprise a mirror, a lens, a light cable, or one or more masks.

10. The method of claim 1, wherein the at least one light source is configured to generate a light pattern to avoid ablation of one or more blood vessels in proximity to the target region and to prevent bleeding in or near the target region.

11. The method of claim 10, wherein the at least one light source is configured to use image processing to generate the light pattern.

12. The method of claim 11, wherein the at least one light source is configured to interrupt laser pulses over the one or more blood vessels as ablation is being performed, based at least in part on one or more sensor readings or measurements.

13. The method of claim 1, further comprising using an image recognition module or one or more ranging sensors to actively or dynamically adjust a light pattern or a focus of the at least one light source to maintain uniform power on one or more tissue regions during ablation.

14. The method of claim 1, further comprising using a cauterization module to target one or more ablated blood vessels and to adjust a power or a focus of the at least one light source to cauterize the one or more ablated blood vessels post-ablation.

15. The method of claim 1, wherein in (b), the photodisrupting of the target region is performed at a predetermined intensity or for a predetermined time interval.

16. The method of claim 1, wherein the one or more high aspect ratio structures comprise a microwire, a microelectrode, or a probe.

17. The method of claim 1, wherein the at least one light source comprises light having a wavelength of at most 360 nm.

18. The method of claim 1, wherein the at least one light source has an average power of at least 0.1 milliwatts.

19. The method of claim 1, wherein the at least one light source comprises a pulsed laser, wherein the pulsed laser is configured to generate the one or more pulses, the one or more pulses having (i) a duration of 1 picosecond to 10 microseconds or (ii) a predetermined pulse repetition frequency between 1 hertz (Hz) and 100 megahertz (MHz).

20. The method of claim 1, wherein the implantable device is a brain machine interface (BMI) device.

21. The method of claim 1, wherein the implantable device is configured to record neural signals.

22. A method of penetrating a biological membrane in proximity to a subject's brain, comprising:

(a) identifying a target region of the biological membrane;

(b) photodisrupting the target region to a target depth to remove at least a portion of the biological membrane to expose underlying brain tissue, wherein the biological membrane is a pia mater, wherein the photodisrupting comprises using at least one light source and one or more optical elements, and wherein the at least one light source emits one or more pulses with a pulse energy density from about 1 $\mu J/cm^2$ to about 100 $J/cm^2$; and (c) inserting one or more high aspect ratio structures through the photodisrupted target region into a tissue below the biological membrane, wherein the tissue below the biological membrane comprises the underlying brain tissue.

* * * * *